(12) United States Patent
Schober

(10) Patent No.: US 6,839,794 B1
(45) Date of Patent: Jan. 4, 2005

(54) METHOD AND SYSTEM TO MAP A SERVICE LEVEL ASSOCIATED WITH A PACKET TO ONE OF A NUMBER OF DATA STREAMS AT AN INTERCONNECT DEVICE

(75) Inventor: Richard L. Schober, Cupertino, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 656 days.

(21) Appl. No.: 09/977,529

(22) Filed: Oct. 12, 2001

(51) Int. Cl.$^7$ .................. G06F 13/00; G06F 15/173; H04J 1/16
(52) U.S. Cl. .................. 710/316; 709/240; 370/229
(58) Field of Search .................. 710/316–317; 370/392, 229, 395, 369, 389; 709/240, 241, 242

(56) References Cited

U.S. PATENT DOCUMENTS

| | | | |
|---|---|---|---|
| 5,615,161 A | 3/1997 | Mu | |
| 5,644,604 A | 7/1997 | Larson | |
| 5,740,346 A | 4/1998 | Wicki et al. | |
| 5,768,300 A | 6/1998 | Sastry et al. | |
| 5,838,684 A | 11/1998 | Wicki et al. | |
| 5,892,766 A | 4/1999 | Wicki et al. | |
| 5,931,967 A | 8/1999 | Shimizu et al. | |
| 5,959,995 A | 9/1999 | Wicki et al. | |
| 5,987,629 A | 11/1999 | Sastry et al. | |
| 5,991,296 A | 11/1999 | Mu et al. | |
| 6,003,064 A | 12/1999 | Wicki et al. | |
| 6,226,265 B1 * | 5/2001 | Nakamichi et al. | 370/235 |
| 6,246,701 B1 * | 6/2001 | Slattery | 370/503 |
| 6,442,135 B1 * | 8/2002 | Ofek | 370/229 |

OTHER PUBLICATIONS

InfiniBand Architecture Specification, General Specification, Oct. 24, 2000, pp. 880, vol. 1.
"InfiniBand Switch Chip Runs at 10Gbps On Eight Ports", Nicholas Cravotta, Nov. 8, 2001, EDN, 1 page.
"Assemble Fast Switch Fabrics With 32–Port InfiniBand Node p. 60", Electronic Design, Oct. 15, 2001, 4 pages.
"RedSwitch, Inc. Announces Industry's Highest Performance and Highest Integration InfiniBand Switch Chip", RedSwitch Press Release, Oct. 16, 2001, 2 pages.
"RedSwitch Gearing Up To Launch New Chip", Steve Tanner, Silicon Valley Business Ink, Oct. 26, 2001, 3 pages.
"Mellanox Integrates Serdes Into Infiniband Switch", Jerry Ascierto, EE Times, Oct. 23, 2001, 3 pages.
"Switch Chip Expands InfiniBand Integration", EEM File 3130, Tony Chance, 2 pages.

(List continued on next page.)

*Primary Examiner*—Tim Vo

(57) ABSTRACT

A method and system automatically map a service level to a data stream within an interconnect device. A plurality of data streams is selected, each of the plurality of data streams being associated with a respective output port of the interconnect device. The plurality of data streams is selected based on (1) an input port of the interconnect device on which a packet is received and (2) a service level associated with the packet. In parallel with the selecting of the plurality of data streams, an output port of the interconnect device is selected to receive the packet from the input port of the interconnect device on which the packet is received. A data stream, from among the selected plurality of data streams, is selected utilizing the selected output port, the selected data stream being selected as a data stream into which the packet is included for transmission from the selected output port of the interconnect device.

31 Claims, 18 Drawing Sheets

OTHER PUBLICATIONS

"RedSwitch Announces 16 Gbyte/s Throughout Switch Product for RapidIO Architecture", RedSwitch Press Release, Milpitas, Calif., May 15, 2001, Tony Chance, May 15, 2001, 2 pages.

"RedSwitch and Agilent Technologies Unveil 160–GB/s Throughout Switch Product for InfiniBand Architecture", RedSwitch Press Release, Intel Developer Forum Conference, San Jose, Calif., Feb. 27, 2001, Mark Alden–Agilent, Tony Chance–RedSwitch, 2 pages.

* cited by examiner

GRANT 180

| TOTAL BLOCKS SENT | ERROR CODE | TOTAL GRANT COUNT | TRANS-FER RATE | OUTPUT PORT | VIRTUAL LANE | PACKET LENGTH | REQUEST IDENTIFIER | INPUT PORT | GRANT CODE |
|---|---|---|---|---|---|---|---|---|---|
| 184 | 186 | 136 | 146 | 132 | 134 | 144 | 142 | | 182 |
| 63  56 | 55  44 | 43  39 | 38  37 | 36  32 | 31  28 | 27  17 | 16  07 | 06  02 | 01  00 |

Fig. 8

TRANSFER RATE

| VALUE | MEANING |
|---|---|
| 0 0 | 1 CYCLE PER WORD |
| 0 1 | 4 CYCLES PER WORD |
| 1 0 | 3 CYCLES PER WORD (RESERVED) |
| 1 1 | 12 CYCLES PER WORD (RESERVED) |

GRANT CODE

| VALUE | MEANING |
|---|---|
| 0 0 | NULL |
| 0 1 | VALID |
| 1 0 | ERROR |
| 1 1 | RESERVED |

ERROR CODE

| VALUE | MEANING |
|---|---|
| 0 0 0 0 0 0 0 0 | NO ERROR |
| 0X 0 0 0 0 0 1 | UNICAST DLID OUT-OF-RANGE |
| 0X 0 0 0 0 1 0 | UNICAST FORWARDING TALE ENTRY NOT VALID OR DEFAULT MULTICAST PORT REGISTERS NOT VALID |
| 0X 0 0 0 0 1 1 | OUTPUT PORT NOT VALID FOR MGMT PORT DIRECTED-ROUTE PACKET |
| 0X 1 X X X X 1 | (OUTPUT PORT = INPUT PORT) & (PORT ≠ 0) |
| 0X 1 X X X 1 X | SL-TO-VL MAP TABLE ENTRY NOT VALID |
| 0X 1 X X 1 X X | PACKET LARGER THAN NEIGHBOR MTU |
| 0X 1 1 0 X X X | RAW PACKET NOT VALID FOR OUTPUT PORT |
| 0X 1 1 1 X X X | P-KEY NOT VALID FOR OUTPUT PORT |
| 01 X X X X X X | P-KEY NOT VALID FOR INPUT PORT |
| 1 1 1 1 1 1 0 1 | OUTPUT PORT OFFLINE |
| 1 1 1 1 1 1 1 0 | HEAD-OF-QUEUE LIFETIME TIMEOUT |
| 1 1 1 1 1 1 1 1 | SWITCH LIFETIME TIMEOUT |

METHOD AND SYSTEM TO MAP A SERVICE LEVEL ASSOCIATED WITH A PACKET TO ONE OF A NUMBER OF DATA STREAMS AT AN INTERCONNECT DEVICE

FIELD OF THE INVENTION

The present invention relates generally to the field of data communications and, more specifically, to the mapping of a service level, associated with a packet received at an interconnect device, to a data stream (e.g., a virtual lane).

BACKGROUND OF THE INVENTION

Existing networking and interconnect technologies have failed to keep pace with the development of computer systems, resulting in increased burdens being imposed upon data servers, application processing and enterprise computing. This problem has been exasperated by the popular success of the Internet. A number of computing technologies implemented to meet computing demands (e.g., clustering, fail-safe and 24×7 availability) require increased capacity to move data between processing nodes (e.g., servers), as well as within a processing node between, for example, a Central Processing Unit (CPU) and Input/Output (I/O) devices.

With a view to meeting the above described challenges, a new interconnect technology, called the InfiniBand™, has been proposed for interconnecting processing nodes and I/O nodes to form a System Area Network (SAN). This architecture has been designed to be independent of a host Operating System (OS) and processor platform. The Infini-Band™ Architecture (IBA) is centered around a point-to-point, switched IP fabric whereby end node devices (e.g., inexpensive I/O devices such as a single chip SCSI or Ethernet adapter, or a complex computer system) may be interconnected utilizing a cascade of switch devices. The InfiniBand™ Architecture is defined in the InfiniBand™ Architecture Specification (the IBA specification) Volume 1, Release 1.0, released Oct. 24, 2000 by the InfiniBand Trade Association. The IBA supports a range of applications ranging from back plane interconnect of a single host, to complex system area networks, as illustrated in FIG. 1 (prior art). In a single host environment, each IBA switch fabric may serve as a private I/O interconnect for the host providing connectivity between a CPU and a number of I/O modules. When deployed to support a complex system area network, multiple IBA switch fabrics may be utilized to interconnect numerous hosts and various I/O units.

Within a switch fabric supporting a System Area Network, such as that shown in FIG. 1, there may be a number of devices having multiple input and output ports through which data (e.g., packets) is directed from a source to a destination. Such devices include, for example, switches, routers, repeaters and adapters (exemplary interconnect devices). Where data is processed through a device, it will be appreciated that multiple data transmission requests may compete for resources of the device. For example, where a switching device has multiple input ports and output ports coupled by a crossbar, packets received at multiple input ports of the switching device, and requiring direction to specific outputs ports of the switching device, compete for at least input, output and crossbar resources.

In order to facilitate multiple demands on device resources, an arbitration scheme is typically employed to arbitrate between competing requests for device resources. Requests may include both unicast and multicast transmission requests pertaining to packet received on any one of the multiple input ports of the switching device. Arbitration schemes typically include either (1) distributed arbitration schemes, whereby the arbitration process is distributed among multiple nodes, associated with respective resources, through the device or (2) centralized arbitration schemes whereby arbitration requests for all resources is handled at a central arbiter. An arbitration scheme may further employ one of a number of arbitration policies, including a round robin policy, a first-come-first-serve policy, a shortest message first policy or a priority based policy, to name but a few.

The physical properties of the IBA interconnect technology have been designed to support both module-to-module (board) interconnects (e.g., computer systems that support I/O module add in slots) and chassis-to-chassis interconnects, as to provide to interconnect computer systems, external storage systems, external LAN/WAN access devices. For example, an IBA switch may be employed as interconnect technology within the chassis of a computer system to facilitate communications between devices that constitute the computer system. Similarly, an IBA switched fabric may be employed within a switch, or router, to facilitate network communications between network systems (e.g., processor nodes, storage subsystems, etc.). To this end, FIG. 1 illustrates an exemplary System Area Network (SAN), as provided in the InfiniBand Architecture Specification, showing the interconnection of processor nodes and I/O nodes utilizing the IBA switched fabric.

A number of switching and routing protocols enable the definition of service levels, which may be utilized to identify and differentiate traffic flows within a network. For example, the IBA specification defines a number of service levels (SL) that are utilized to identify different flows within an IBA subnet. The service level associated with a particular packet is carried in the local routing header of a packet and is an indication as to the service class of the relevant packet. While the IBA does not assign specific meaning to each service level, other protocols may do so. Service levels are typically intended to facilitate a mechanism to provide differentiated services, improve switched fabric utilization, and to avoid deadlock.

A number of switching and routing protocols enable the definition of a number of data streams that may be received at, or communicated from, a network (or interconnect) device. For example, the IBA specification defines so-called virtual lanes (VLs). Utilizing the IBA as an example, as a packet is routed across a network (or a subnet), it may be desirable or necessary for that packet to be transferred from one data stream (or virtual lane) to another. Referring to FIG. 2 (prior art), a network 12 including a number of interconnect devices 13 is illustrated. FIG. 2 also illustrates that a certain number of virtual lanes are defined on links between various interconnect devices. It will be noted that links feeding into and out of an interconnect device 13 at the center of the network 12 provide a larger number of virtual lanes, while links feeding into and out of interconnect devices 13 at the edges of the network 12 support a lesser number of virtual lanes. The network 12 may be so implemented as there is a higher probability of link contention towards the center of the network 12. A larger number of virtual lanes are accordingly implemented towards the center of the network 12 to reduce the negative impact of link contention. It will be appreciated that, as a packet travels towards or from the center of the network 12 illustrated FIG. 2, it may be necessary to transfer a particular packet from one virtual lane to another. For example, a packet may be transferred from one virtual lane to another if a particular link does not support a virtual lane previously utilized by the packet.

Again taking the IBA as an example, in order to facilitate the transfer of a packet from one virtual lane to another, the IBA (pages 152–153) specifies a service level-to-virtual lane mapping scheme that may be utilized to transfer a packet from one virtual lane to another as the packet traverses a network (e.g., a subnet). Specifically, service level-to-virtual lane mapping may be required in channel adapters, switches, and routers that support more than one data virtual lanes. The IBA specifies that such service level-to-virtual lane mapping be performed utilizing a programmable mapping table, termed the SL-to-VL MappingTable. An example of this table is provided immediately below:

TABLE 1

| Component | Access | Length (bits) | Offset (bits) | Description |
|---|---|---|---|---|
| SLV0toVL | RW | 4 | 0 | Then number of the VL on which packets using SL0 are output. 15 forces the packets to be dropped. |
| SL1toVL | RW | 4 | 0 | The VL associated with SL1 |
| SL2toVL | RW | 4 | 4 | The VL associated with SL2 |
| SL3toVL | RW | 4 | 8 | The VL associated with SL3 |
| SL4toVL | RW | 4 | 12 | The VL associated with SL4 |
| SL5toVL | RW | 4 | 16 | The VL associated with SL5 |
| SL6toVL | RW | 4 | 20 | The VL associated with SL6 |
| SL7toVL | RW | 4 | 24 | The VL associated with SL7 |
| SL8toVL | RW | 4 | 28 | The VL associated with SL8 |
| SL9toVL | RW | 4 | 32 | The VL associated with SL9 |
| SL10toVL | RW | 4 | 36 | The VL associated with SL10 |
| SL11toVL | RW | 4 | 40 | The VL associated with SL11 |
| SL12toVL | RW | 4 | 44 | The VL associated with SL12 |
| SL13toVL | RW | 4 | 48 | The VL associated with SL13 |
| SL14toVL | RW | 4 | 52 | The VL associated with SL14 |
| SL15toVL | RW | 4 | 56 | The VL associated with SL15 |

Specifically, in the case of an interconnect device in the form of a channel adapter and router, the above table provides a mapping of the service level to a virtual lane supported by an output port of the relevant interconnect device. The table is 16 entries deep, with each port of the relevant interconnect device having an independent table. All 16 possible values for a service level are included within the table. The table indicates the virtual lane number to be used when a packet is transmitted from a particular output port.

In the case of an interconnect device in the form of a switch, the above table maps a service level, input port and output port of the relevant packet to a virtual lane to be used for a next hop within the network.

In short, the above table can be conceptually viewed as a set of tables, one for each output port. Each of these "per output port" tables indicates which virtual lane should be utilized by an outgoing packet, based on a service level associated with the packet and the port of the interconnect device on which the packet arrived.

SUMMARY OF THE INVENTION

According to the present invention, there is provided method and system automatically to map a service level to a data stream within an interconnect device. A plurality of data streams is selected, each of the plurality of data streams being associated with a respective output port of the interconnect device. The plurality of data streams is selected based on (1) an input port of the interconnect device on which a packet is received and (2) a service level associated with the packet. In parallel with the selecting of the plurality of data streams, an output port of the interconnect device is selected to receive the packet from the input port of interconnect device on which the packet is received. A data stream, from among the selected plurality of data streams, is selected utilizing the selected output port, the selected data stream being selected as a data stream into which the packet is included for transmission from the selected output port of interconnect device.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 8 illustrates an exemplary grant that may be issued responsive to any one of the requests discussed in the present application.

DETAILED DESCRIPTION

A method and system to map a service level, associated with a packet received an interconnect device, to an output data stream (e.g., a virtual lane) supported by the interconnect device are described. In the following description, for purposes of explanation, numerous specific details are set forth in order to provide a thorough understanding of the present invention. It will be evident, however, to one skilled in the art that the present invention may be practiced without these specific details.

For the purposes of the present invention, the term "interconnect device" shall be taken to include switches, routers, repeaters, adapters, or any other device that provides interconnect functionality between nodes. Such interconnect functionality may be, for example, module-to-module or chassis-to-chassis interconnect functionality. While an exemplary embodiment of the present invention is described below as being implemented within a switch deployed within an InfiniBand architectured system, the teachings of the present invention may be applied to any interconnect device within any interconnect architecture.

Figure 1:
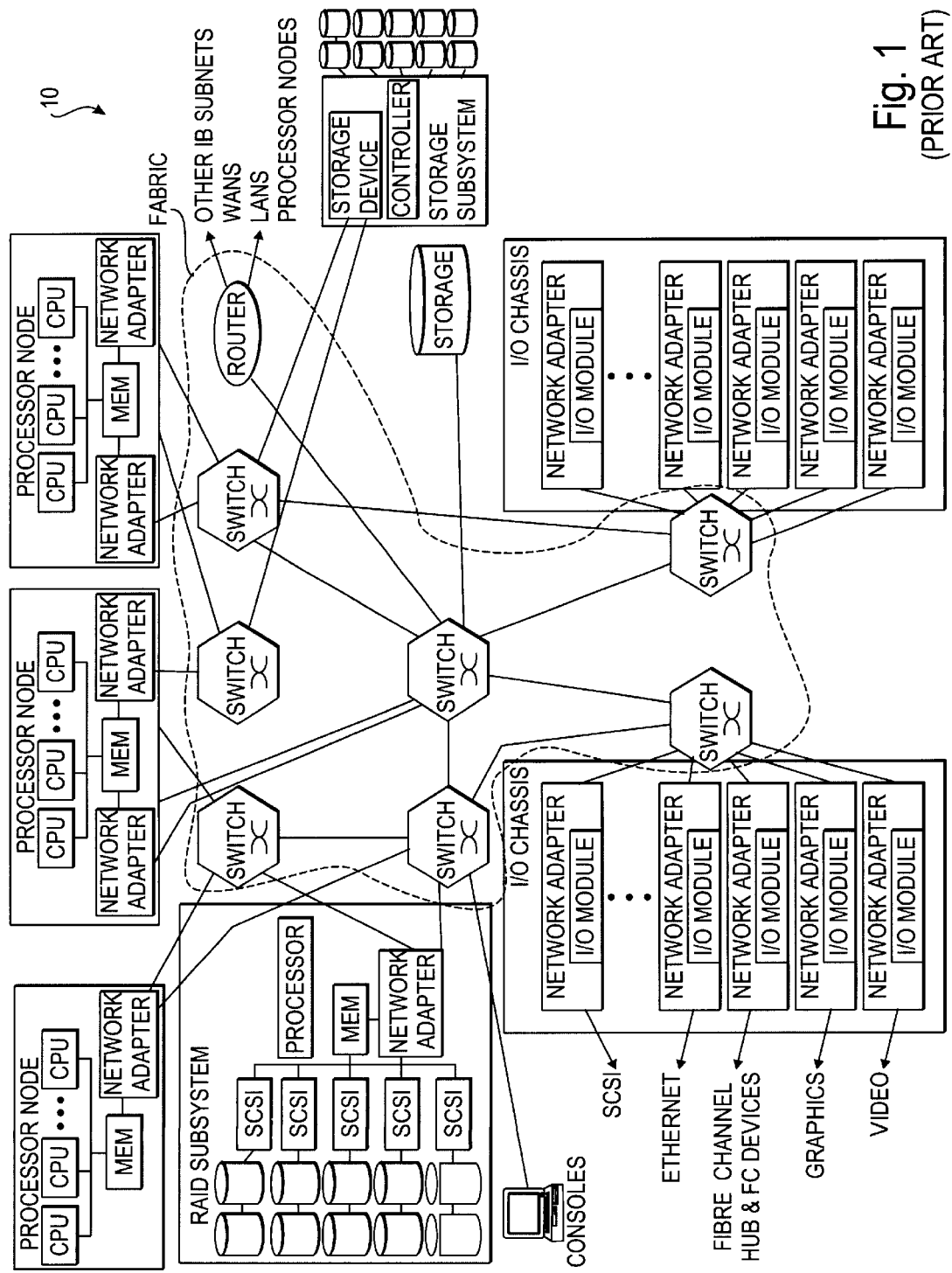
FIG. 1 is a diagrammatic representation of a System Area Network, according to the prior art, as supported by a switch fabric.
Figure 2:
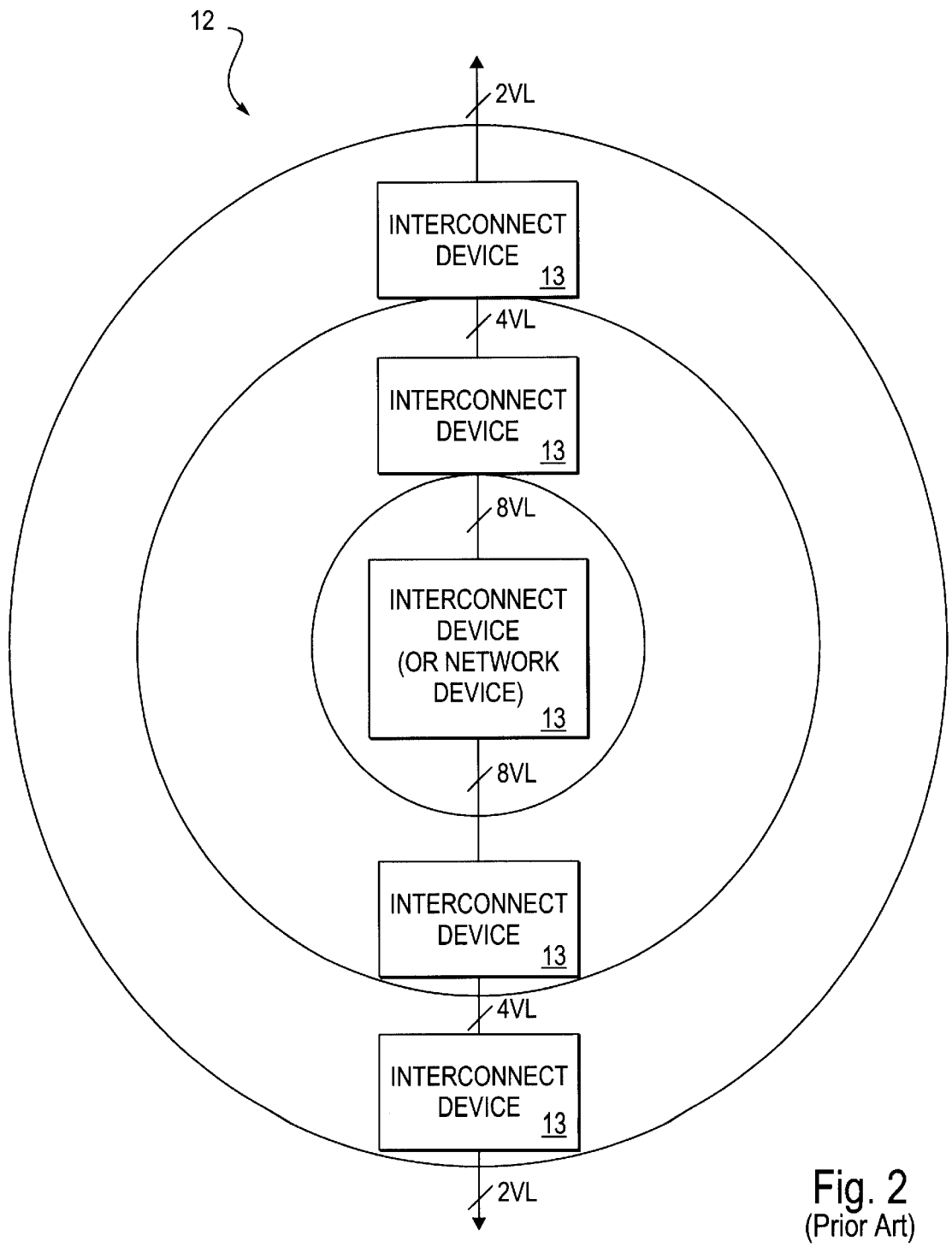
FIG. 2 is a block diagram illustrating a prior art network with varying numbers of virtual lanes between interconnect devices.
Figure 3A:
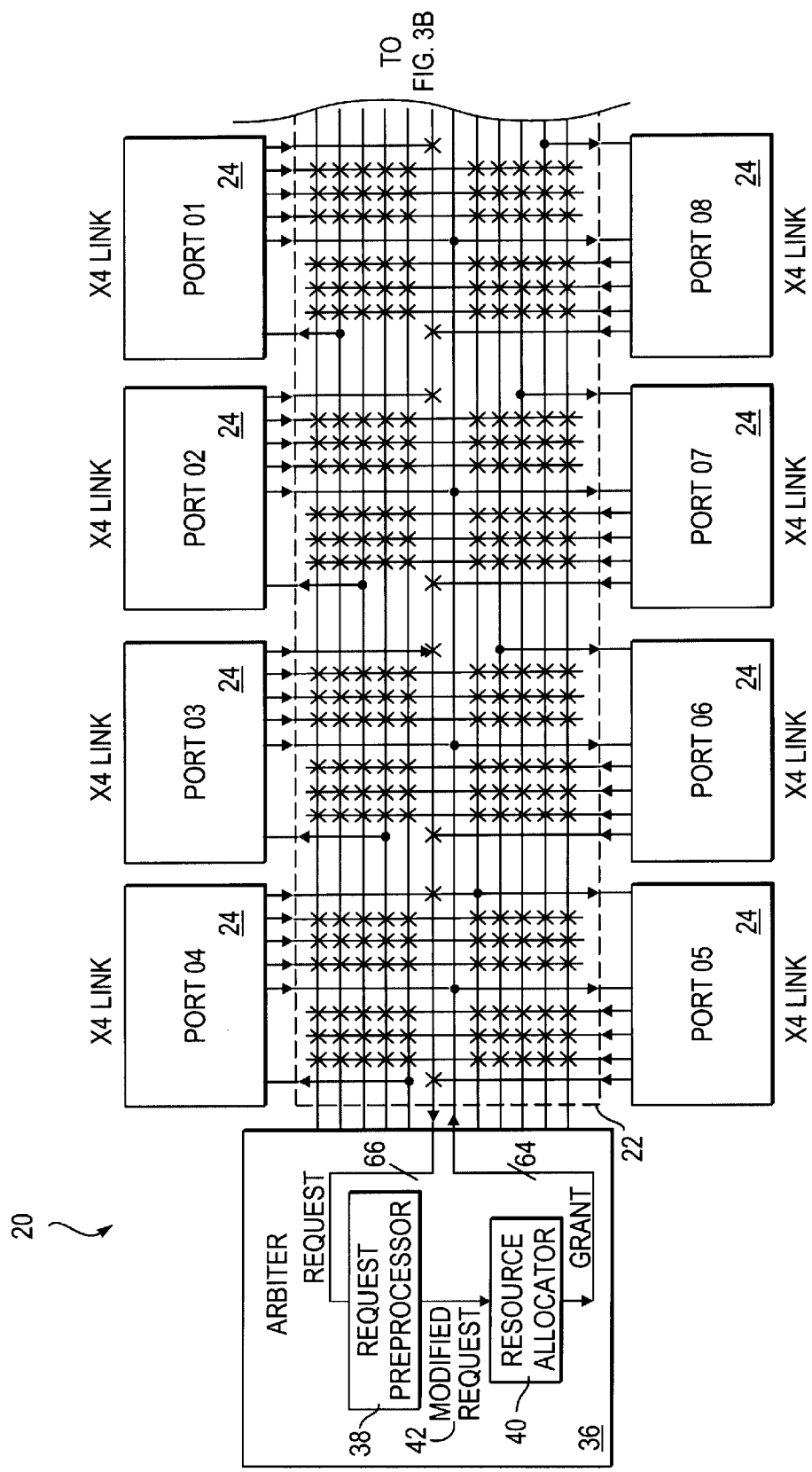
FIGS. 3A and 3B provide a diagrammatic representation of a data path, according to an exemplary embodiment of the present invention, implemented within an interconnect device (e.g., a switch).
Figure 3B:
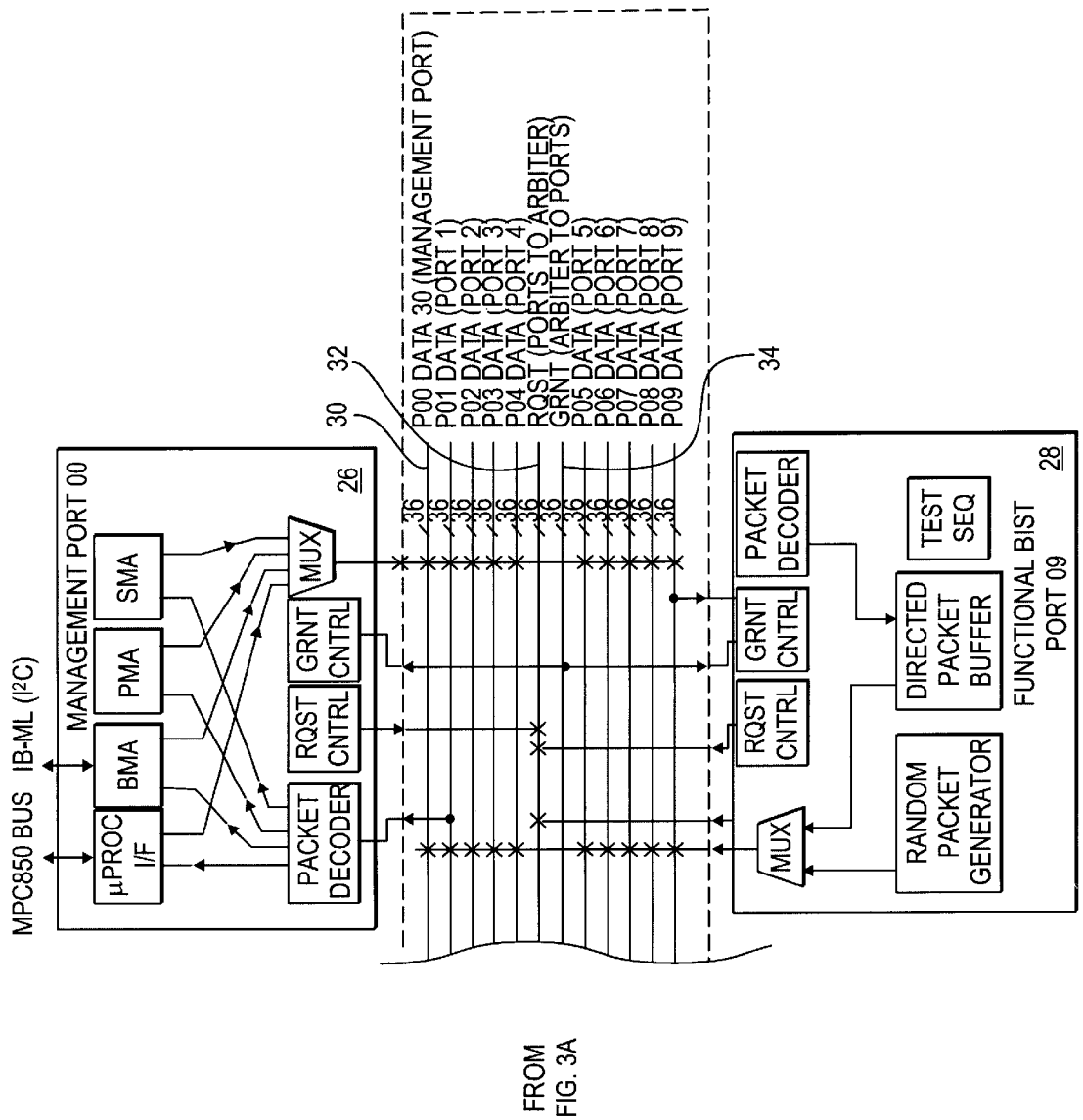

FIGS. 3A and 3B provide a diagrammatic representation of a data path 20, according to an exemplary embodiment of the present invention, implemented within an interconnect device (e.g., a switch). The data path 20 is shown to include a crossbar 22 that includes ten 36-bit data buses 30, a 66-bit request bus 32 and a 64-bit grant bus 34. Coupled to the crossbar 22 are eight communications ports 24 that issue resource requests to an arbiter 36 via the request bus 32, and that receive resource grants from the arbiter 36 via the grant bus 34. The resource requests and grants pertain to the transmission of packets between ports 24 via the crossbar 22.

The arbiter 36 includes a request preprocessor 38 to receive resource requests from the request bus 32 and to generate a modified resource request 42 to a resource allocator 40. The resource allocator 40 then issues a resource grant on the grant bus 34. Further details regarding the arbiter 36 will be discussed in detail below.

In addition to the eight communications ports 24, a management port 26 and a functional Built-In-Self-Test (BIST) port 28 are also coupled to the crossbar 22. The management port 26 includes a Sub-Network Management Agent (SMA) that is responsible for network configuration, a Performance Management Agent (PMA) that maintains error and performance counters, a Baseboard Management Agent (BMA) that monitors environmental controls and status, and a microprocessor interface.

The functional BIST port 28 supports stand-alone, at-speed testing of an interconnect device including the data path 20. The functional BIST port 28 includes a random packet generator, a directed packet buffer and a return packet checker.

Figure 4:
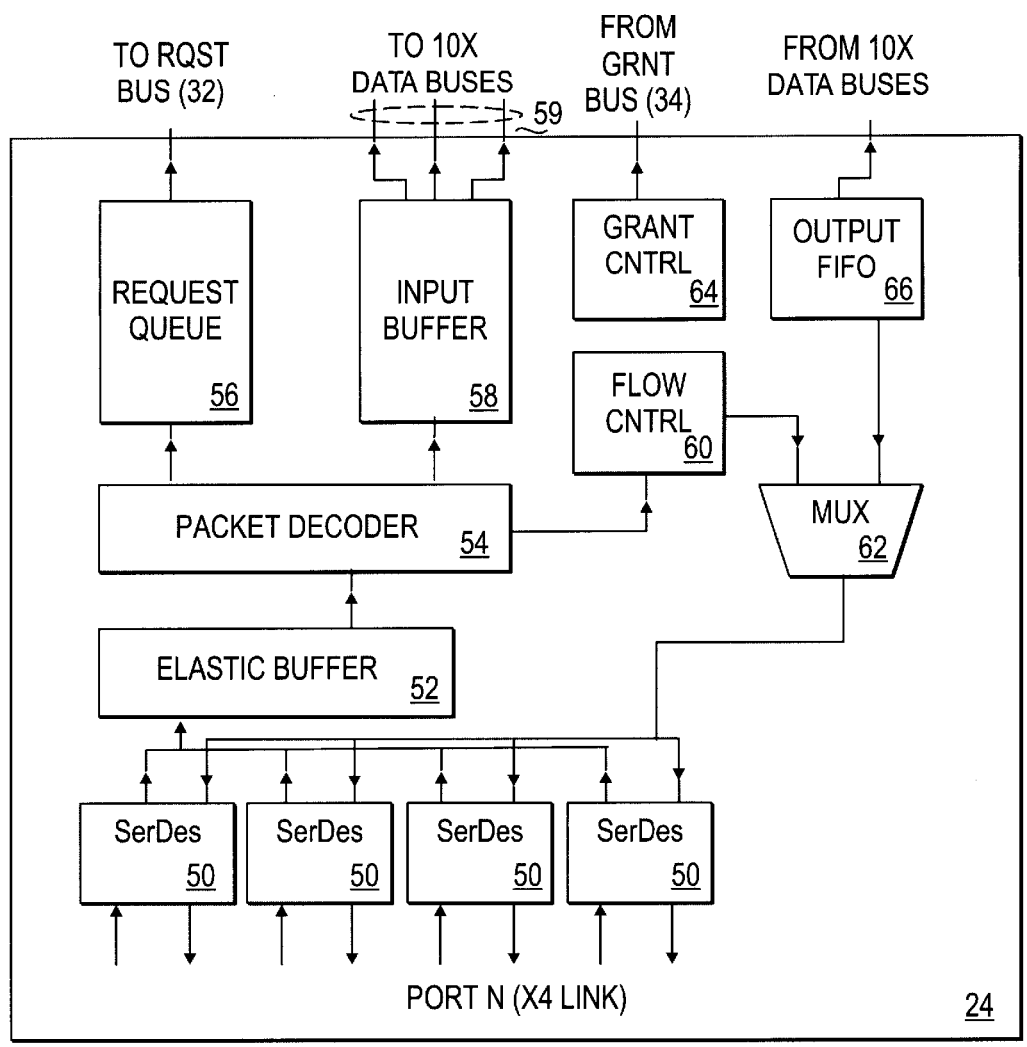
FIG. 4 is a diagrammatic representation of communications port, according to an exemplary embodiment of the present invention, which may be employed within a data path.

Turning now to the communication ports 24, FIG. 4 is a block diagram providing further architectural details of an exemplary communications port 24 as may be implemented within the data path 20. While the data path 20 of FIGS. 3A and 3B are shown to include eight ×4 duplex communication ports 24, the present invention is not limited to such a configuration. Referring specifically to FIG. 4, each communications port 24 is shown to include four Serializer-Deserializer circuits (SerDes's) 50 via which 32-bit words are received at and transmitted from a port 24. Each SerDes 50 operates to convert a serial, coded (8B10B) data bit stream into parallel byte streams, which include data and control symbols. Data received via the SerDes's 50 at the port 24 is communicated as a 32-bit word to an elastic buffer 52. The elastic buffer 52 has two primary functions, namely:

(1) To accommodate frequency differences (within a specified tolerance) between clocks recovered from an incoming bit stream and a clock local to the data path 20; and (2) To accommodate skew between symbols being received at the data path 20 on four serial data channels.

Incoming data is further synchronized with a core clock as it is propagated through the elastic buffer 52.

Figure 5:
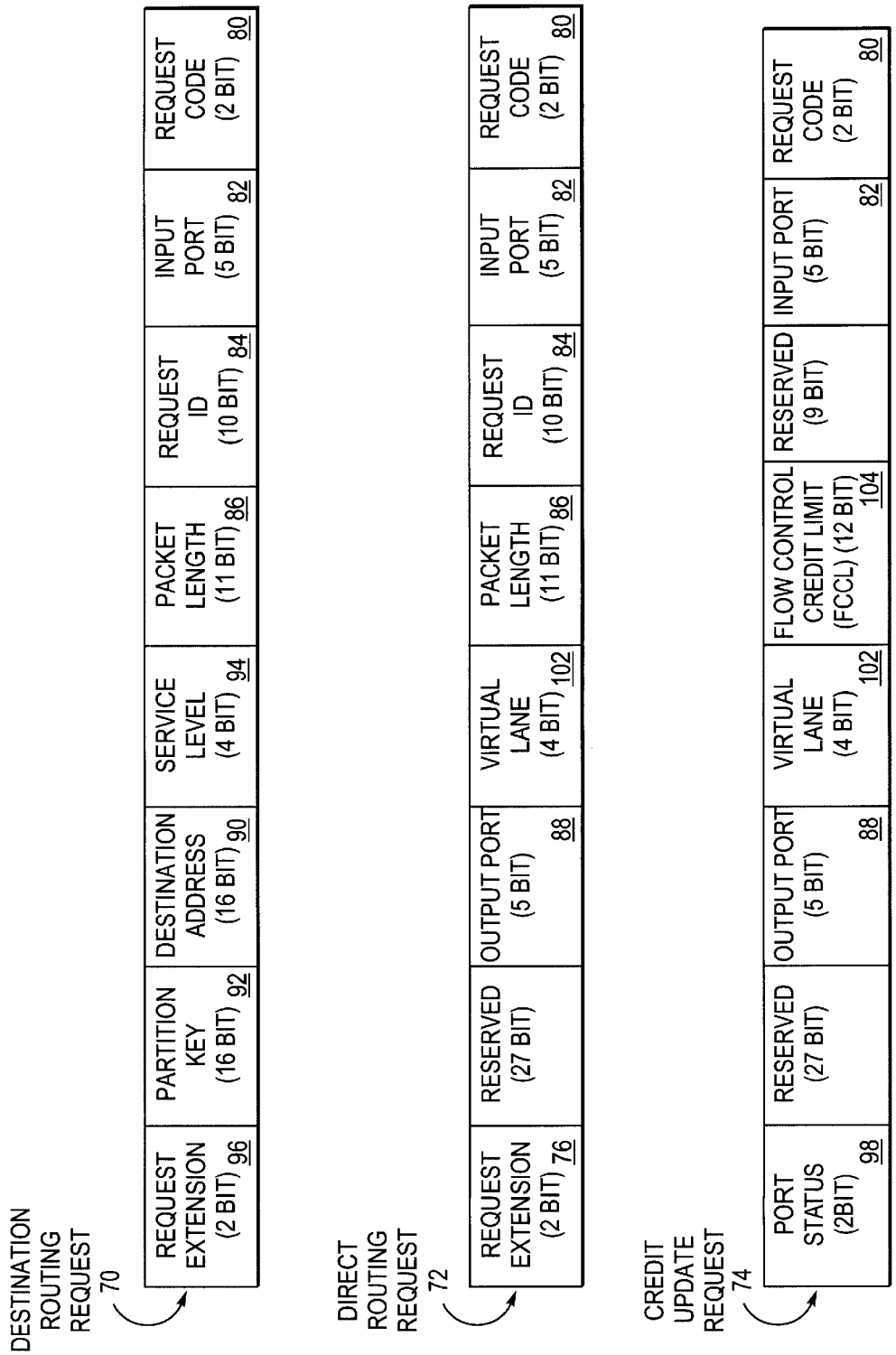
FIG. 5 illustrates exemplary packet transfer requests and an exemplary credit update request.

From the elastic buffer 52, packets are communicated to a packet decoder 54 that generates a request, associated with a packet, which is placed in a request queue 56 for communication to the arbiter 36 via the request bus 32. In the exemplary embodiment of the present invention, the types of requests generated by the packet decoder 54 for inclusion within the request queue 56 include packet transfer requests and credit update requests. FIG. 5 illustrates two examples of packet transfer requests, namely a destination routing request 70 and a direct routing request 72. An exemplary credit update request 74 is also shown.

Return to FIG. 4, each communications port 24 is also shown to include a 20 Kbytes input buffer 58, the capacity of which is divided equally among data virtual lanes (VLs) supported by the data path 20. Virtual lanes are, in one embodiment, independent data streams that are supported by a common physical link. Further details regarding the concept of "virtual lanes" is provided in the InfiniBand™ Architecture Specification, Volume 1, Oct. 24, 2000.

The input buffer 58 of each port 24 is organized into 64-byte blocks, and a packet may occupy any arbitrary set of buffer blocks. A link list keeps track of packets and free blocks within the input buffer 58.

Each input buffer 58 is also shown to have three read port-crossbar inputs 59.

A flow controller 60 also receives input from the packet decoder 54 to generate flow control information (e.g., credits) that may be outputted from the port 24 via a multiplexer (MUX) 62 and the SerDes 50 to other ports 24. Further details regarding an exemplary credit-based flow control are provided in the InfiniBand™ Architecture Specification, Volume 1.

The communications port 24 also includes a grant controller 64 to receive transfer grants 180 from the arbiter 36 via the grant bus 34. FIG. 8 provides an example of a transfer grant 180.

An output FIFO 66 has sufficient capacity to hold a maximum-sized packet, according to a communications protocol supported by the data path 20. The output FIFO 66 provides elasticity for the insertion of inter-frame symbols, and flow control messages, between packets. The output FIFO 66 furthermore provides speed matching for moving packets from ×4 to ×1 ports.

Returning to FIG. 5, within the routing requests 70 and 72, a request code 80 is a 2-bit value identifies the request type, an input port identifier 82 identifies a port 24 from which the request was issued, and a request identifier 84 is a "handle" or identifier for a request that allows the grant controller 64 of a communications port 24 to associate a transfer grant 180 with a specific packet. For example, the request identifier 84 may be a pointer to a location within the input buffer 58 of a communications port 24. The request identifier 84 is necessary as a particular port 24 may have a number of outstanding requests that may be granted by the arbiter 36 in any order.

A packet length identifier 86 provides information to the arbiter 36 regarding the length of a packet associated with a request. An output port identifier 88 of the direct routing request 72 identifies a communications port 24 to which the relevant packet should be directed. In lieu of an output port identifier 88, the destination routing request 70 includes a destination address 90 and a partition key 92. A destination routing request 70 may also include a service level identifier 94, and a request extension identifier 96 that identifies special checking or handling that should be applied to the relevant destination routing request 70. For example, the request extension identifier 96 identifies that an associated packet is a subset management packet (VL15), a raw (e.g., non-Infiniband) packet, or a standard packet where the partition key is valid/invalid.

The exemplary credit update request 74 includes a port status identifier 98 that indicates whether an associated output port, identified by the output port identifier 88, is online and, if so, the link width (e.g., 12×, 4× or 1×). Each credit update request 74 also includes a virtual lane identifier 102, a flow control credit limit 104 and an input port identifier 82.

The virtual lane identifier 102 indicates for which virtual channel credit information is updated. The flow control credit limit 104 is a sum of a total number of blocks of data received (modulo 4096) at a remote receiver on the relevant virtual lane, plus the number of 64-byte blocks (credit units) the remote receiver is capable of receiving (or 2048 if the number exceeds 2048) on the given virtual lane.

To compute the number of available credits, the resource allocator 40 subtracts the total number of blocks sent on the relevant virtual lane from the flow control credit limit 104 (modulo 4096). This computation counts packets that have been sent after the remote receiver sent a flow control message, thus making the credit forwarding mechanism tolerant of link delays. The effective computation is:

Available Credits=Reported Credits−(local value of total blocks sent−remote value of total blocks received).

Arbiter

Figure 6:
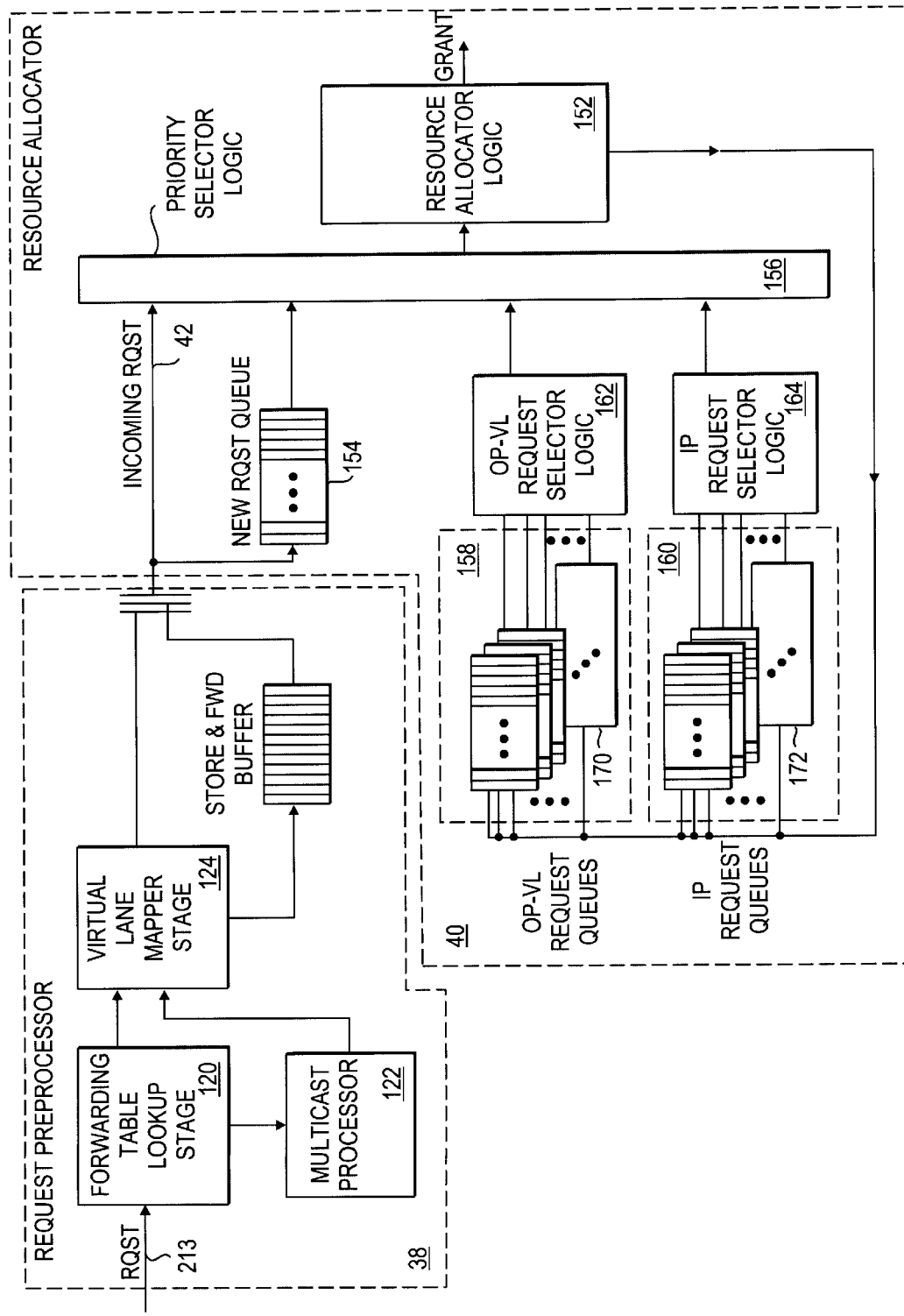
FIG. 6 is a block diagram illustrating the conceptual architecture of an arbiter, according to an exemplary embodiment of the present invention.

FIG. 6 is a conceptual block diagram of the arbiter 36, according to an exemplary embodiment of the present invention. The arbiter 36 is shown to include the request preprocessor 38 and the resource allocator 40. As discussed above, the arbiter 36 implements a central arbitration scheme within the data path 20, in that all requests and resource information are brought to a single location (i.e., the arbiter 36). This offers certain advantages in that a central, consolidated view of resource availability and demand allows efficient resource allocation and potentially increased throughput. It should however be noted that the present invention may also be deployed within a distributed arbitration scheme, wherein decision making is performed at local resource points to deliver potentially lower latencies.

The arbiter 36, in the exemplary embodiment, implements serial arbitration in that one new request is accepted per cycle, and one grant is issued per cycle. The exemplary embodiment implements serialization as it is envisaged that an interconnect device including the data path 20 will have an average packet arrival rate of less than one packet per clock cycle. Again, in deployments where the average packet arrival rate is greater than one packet per clock cycle, the teachings of the present invention may be employed within an arbiter that implements parallel arbitration.

Dealing first with the request preprocessor 38, a request 213 (e.g., a destination routing, direct routing or credit update request 70, 72 or 74) is received on the request bus 32 at a forwarding table lookup stage 120 that includes both unicast and multicast forwarding tables. Specifically, a packet's destination address 90 (or DLID) is utilized to perform a lookup on both the unicast and multicast forwarding tables. If the destination address 90 is for a unicast address, the destination address 90 is translated to an output port number. On the other hand, if the destination address 90 is for a multicast group, a multicast processor 122 spawns multiple unicast requests based on a lookup in the multicast forwarding table.

From the forwarding table lookup stage 120, a request is forwarded to a virtual lane mapper stage 124 where a request's service level identifier 94, input port identifier 82 and output port identifier 132 (determined at stage 120) are utilized to perform a lookup in a virtual lane mapping table 300 (discussed below) and to output a virtual lane identifier.

Figure 7:
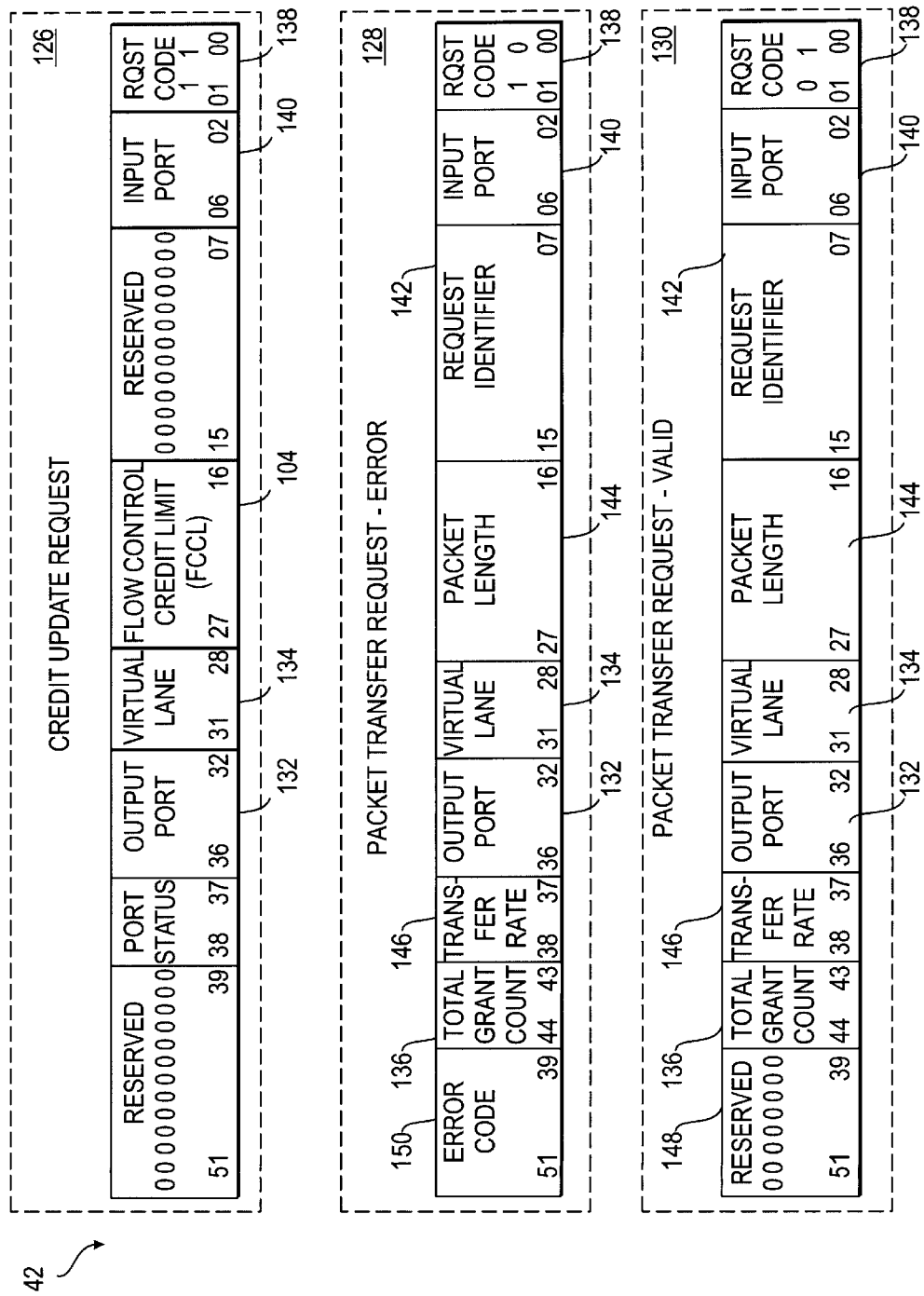
FIG. 7 provides representations of exemplary modified resource requests that may be outputted from a request preprocessor to a resource allocator of the arbiter illustrated in FIG. 6.

Accordingly, the output of the request preprocessor 38 is a modified resource request 42 that is derived from a request, such as any of those shown in FIG. 5. FIG. 7 is a diagrammatic representation of exemplary modified resource requests 42 that may be outputted from the request preprocessor 38 to the resource allocator 40. Taking a valid packet transfer request 130 as an example, it will be noted that this transfer request 130 includes an output port identifier 132 generated at the forwarding table lookup stage 120 and a virtual lane identifier 134 generated at the virtual lane mapper stage 124.

A total grant count 136 is also included within the packet transfer request 130. The total grant count 136 is generated at the forwarding table lookup stage 120, and is utilized to track multicast requests.

Other fields within the valid packet transfer request 130 include a request code 138 that identifies a request type and an input port identifier 140 that identifies the port 24 from which the request originated, a request identifier 142 that uniquely identifies the request, a packet length value 144 that indicates the number of 4-byte words within a packet, a transfer rate value 146 that identifies the speed at which the packet will be sent through the crossbar 22 of the data path 20 and a reserved field 148.

The error packet transfer request 128 is similar to the request 130, but includes an error code 150 that identifies a unique error usually detected within the request preprocessor, but sometimes detected in the resource allocator 40.

The credit update request 126 is shown to include substantially the same information as the credit update request 74 illustrated in FIG. 5.

Returning to FIG. 6, a modified incoming request (e.g., a modified resource request 42 such as any of the requests 126, 128 or 130) is received at the resource allocator 40 from the request preprocessor 38. An incoming (or just-arrived) modified request 42 may proceed directly to resource allocator logic 152, if there is no contention with further pending requests stored in a new request queue 154 that are awaiting processing by the resource allocator logic 152. If such contention does exist, an incoming modified request 42 is placed at the back of the new request queue 154.

As stated above, FIG. 6 is a conceptual diagram of the arbiter 36, and the various queues and selectors described above may not be physically implemented as discrete components or logic blocks. For example, the request queues discussed below and above are, in one embodiment, each implemented as link lists within a single pending request buffer. Nonetheless, for a conceptual understanding of the present invention, it is useful to make reference to FIG. 6.

The resource allocator 40 is shown to include priority selector logic 156 that implements a priority scheme to feed resource requests from one of four sources to the resource allocator logic 152. The four sources from which the priority selector logic 156 selects a resource request are: (1) an incoming request 42; (2) the new request queue 154; (3) a group 158 of output port-virtual lane (OP-VL) request queues 170; and (4) a group 160 of input port (IP) request queues 172. The group 158 of output port-virtual lane (OP-VL) request queues 170 has output port-virtual lane (OP to-VL) request selector logic 162 associated therewith for performing a selection of requests from within the group 158 of queues for presentation to the priority selector logic 156. Similarly, the group 160 of input port (IP) request queues 172 has input port request selector logic 164 associated therewith to select a request for presentation to the priority selector logic 156.

The arbiter 36 employs a two-level allocation policy. The first level of the allocation policy combines flow control credits and port availability in an "all-or-nothing" allocation policy. Considering a request received at the resource allocator logic 152 from the priority selector logic 156, if (1) sufficient flow control credits for a virtual lane identified by the virtual lane identifier 134 of the request are available and (2) if an output port identified by the output port identifier 132 of the request is available, then both the virtual lane and output port identified within the relevant request are allocated to the request by the resource allocator logic 152.

On the other hand, if either insufficient flow control credits for a virtual lane, or the output port itself, are currently unavailable, then no resources (i.e., neither the virtual lane nor the output port) are allocated, and the request 42 is placed at the back of an output port-virtual lane (OP-VL) request queue 170 corresponding to the requested output port and virtual lane.

The second level of the allocation policy is for input buffer read port availability. As this is the second level of the allocation policy, a request must first acquire flow control credits for a virtual lane and a target output port before an input read buffer port is committed by the resource allocator logic 152. Accordingly, once a virtual lane and target output port have been allocated, if an input read buffer port is not available, the relevant request is put on the back of an input port (IP) request queue 172 corresponding to an input port identified within the relevant request by the input port identifier 140.

The output port-virtual lane request selector logic 162 monitors each of the request queues 170 within the group 158 of output port-virtual lane request queues 170. As flow control credits and output ports become available, the selector logic 162 chooses among pending requests in the group 158 of queues 170. In an exemplary embodiment of the present invention where the arbiter 36 supports the Infini-Band™ Architecture, the output port-virtual lane request selector logic 162 may implement the InfiniBand VL arbitration scheme.

Similarly, the input port request selector logic 164 monitors each of the input port request queues 172 within the group 160 as read port-crossbar inputs 59 become available. The selector logic 164 chooses among pending requests utilizing, for example, a simple round-robin selection policy.

Upon the availability of all resources required to satisfy a particular request, the resource allocator logic 152 will issue a transfer grant 180, on the grant bus 34. FIG. 8 illustrates the content of an exemplary transfer grant 180. The transfer grant 180 contains a number of fields in common with a request, as well as an additional grant code 182, a total blocks sent field 184, and an error code field 186.

Processing of Multicast Requests

As discussed above, when a request is received on the request bus 32 at the request preprocessor 38, during a forwarding table lookup stage 120 both unicast and multicast forwarding tables are accessed utilizing a destination address 90. If the destination address 90 is for a unicast address, the destination address 90 is translated to an output port number. On the other hand, if the destination address 90 is for a multicast group, the multicast processor 122 spawns multiple unicast requests based on a lookup in the multicast forwarding table 214.

A modified resource request 42 (e.g., the packet transfer request 130 illustrated in FIG. 7) includes a total grant count 136 that is generated during the forwarding table lookup stage 120, and is utilized to track multicast requests.

Figure 9:
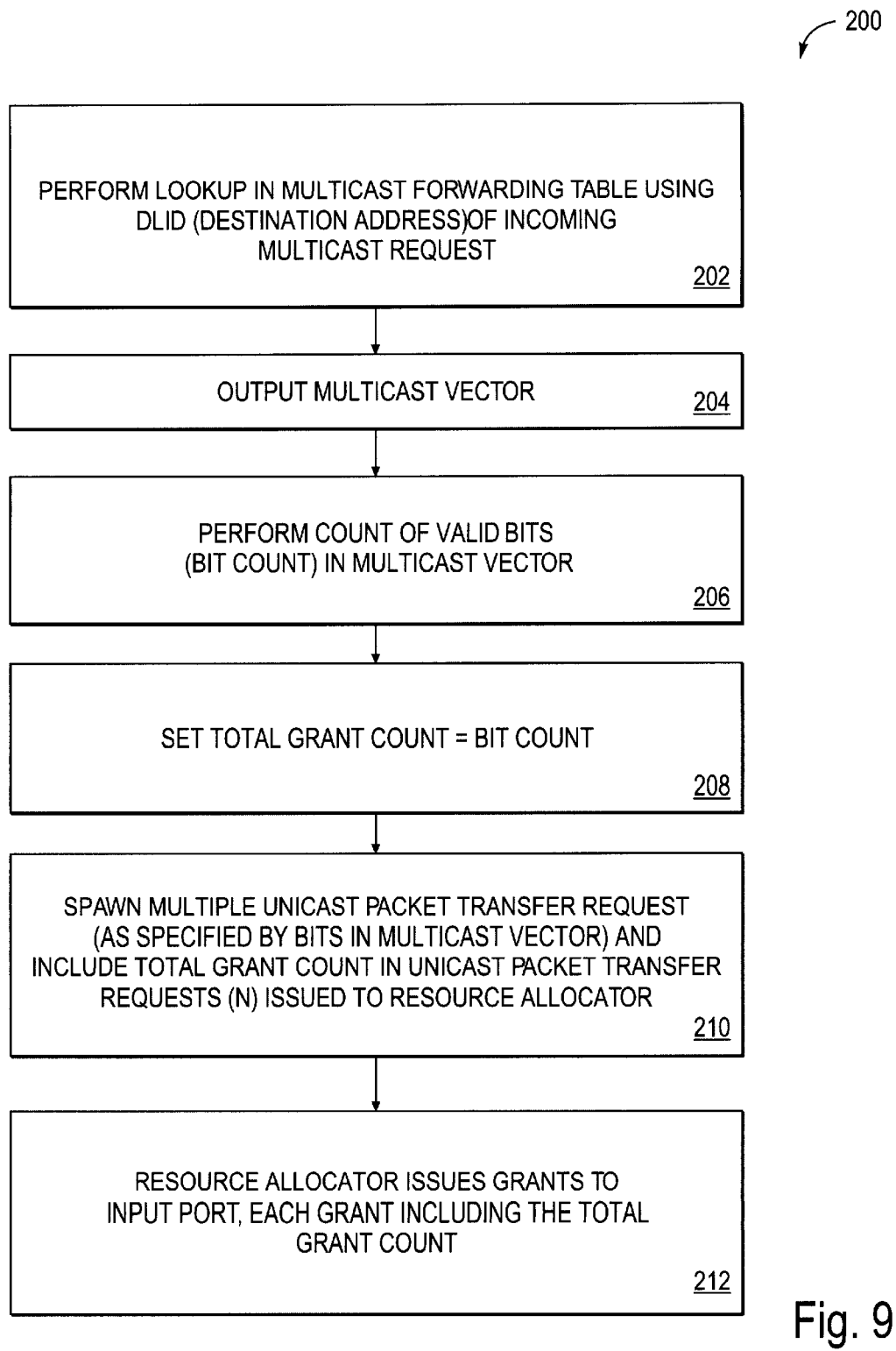
FIG. 9 is a flow chart illustrating a method, according to an exemplary embodiment of the present invention, performed by the arbiter to process a multicast transfer request, and to issue multiple transfer grants responsive to the multicast transfer request.

FIG. 9 is a flow chart illustrating a method 200, according to an exemplary embodiment of the present invention, performed by the arbiter 36 to process a multicast transfer request, and to issue multiple transfer grants responsive to the multicast transfer request.

The method 200 commences at block 202 with the performance of a lookup in a multicast forwarding table 214, utilizing the destination address 90 (otherwise known as the Destination Local Identifier (DLID)) of an incoming multicast transfer request, responsive to receipt of that incoming multicast request. The lookup is performed to identify one or more output port numbers to which a packet associated with the incoming multicast transfer request should be transferred from the input communications port 24.

At block 204, responsive to the lookup in the multicast forwarding table 214, a multicast vector 218 is outputted.

Figure 10:
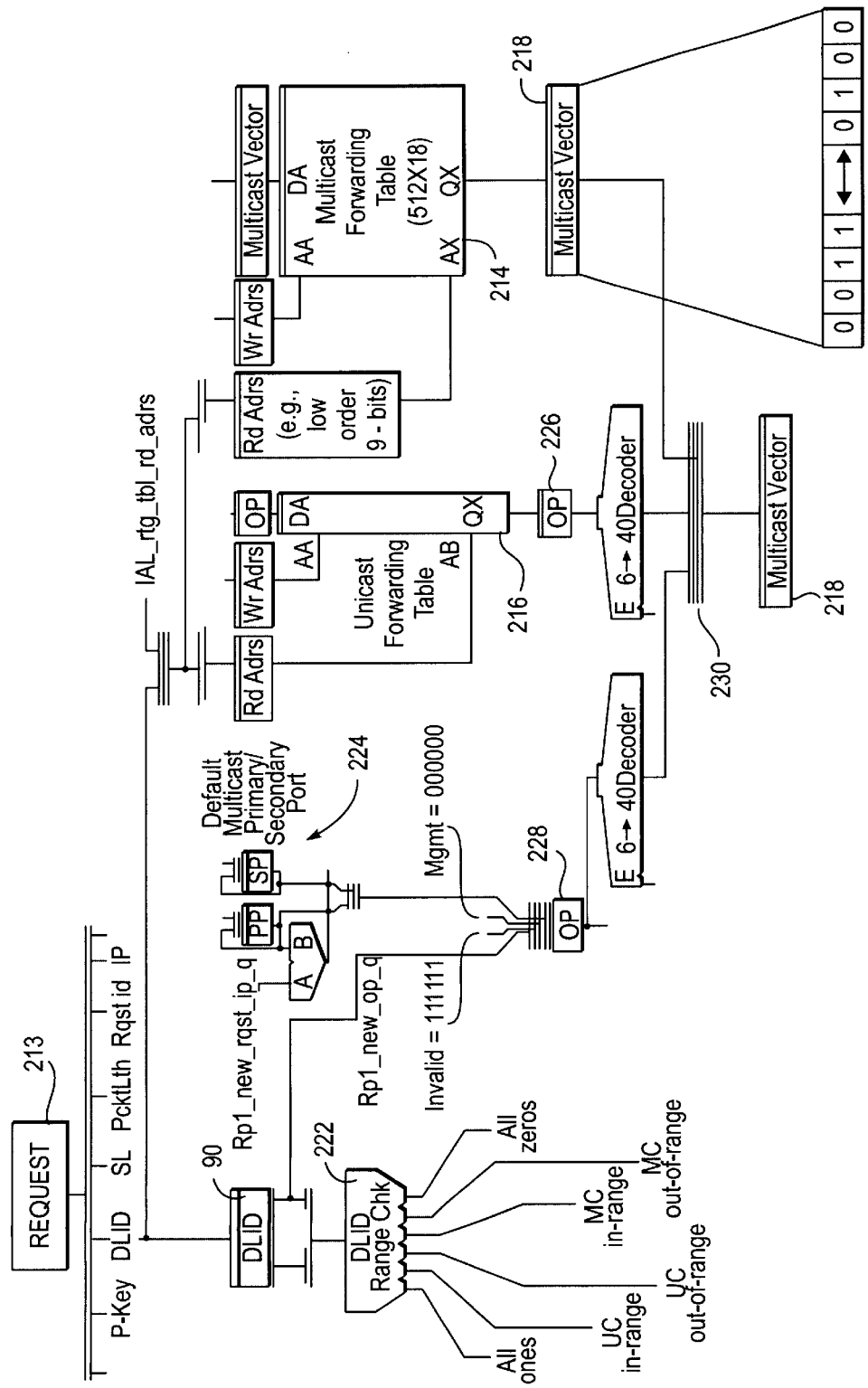
FIG. 10 is a pipestage diagram providing further details regarding a lookup performed on a multicast forwarding table, and the outputting of a multicast vector, according to an exemplary embodiment of the present invention.

FIG. 10 is a pipestagepipestage diagram providing further details regarding the operations performed at blocks 202 and 204 of FIG. 9, according to an exemplary embodiment of the present invention. Specifically, at a first pipe stage, an incoming transfer request 213 is latched, the incoming transfer request 213 including the destination address 90 (or DLID). In one embodiment, low order 14-bits of the destination address 90 are utilized to index a unicast forwarding table 216, and low-order 9-bits of the destination address 90 are utilized to index the multicast forwarding table 214.

As indicated at 222, a range check is done against the destination address 90, and the results are subsequently encoded. Table 2 shows exemplary range checks done against the destination address 90:

TABLE 2

Range Checks

| Range | Use | Dest Code |
|---|---|---|
| FFFF | Permissive DLID - Management Unit | 111 |
| FFFE–C200 | Multicast out-of-range (use default multicast port) | 110 |

TABLE 2-continued

Range Checks

| Range | Use | Dest Code |
|---|---|---|
| C1FF–C000 | Multicast Forwarding Table | 101 |
| BFFF–4000 | Unicast out-of-range (error) | 010 |
| 3FFF–0001 | Unicast Forwarding Table | 001 |
| 0000 | Reserved | 000 |

As indicated at 224, certain transfer requests 213 may require the use of a default multicast port, in which case a selection is performed at 224 as illustrated in FIG. 10. Specifically, a secondary port is chosen if the input port identifier 82 of the request 213 equals the default multicast primary port. Otherwise, the primary port is chosen. A default multicast port is used when either (1) the multicast destination address 90 is out of range (see Table 2) or (2) a multicast forwarding table entry for the destination address 90 is 0 (or invalid).

FIG. 10 illustrates that a hit on the unicast forwarding table 216 utilizing the destination address 90 causes the output of a single output port 226.

In certain cases, an output port 228 may be identified generated without utilizing forwarding tables 216 and 214. Specifically, for a credit update request 74 and direct routing request 72, the output port is specified within the request, as indicated at 88 in FIG. 5. For destination routing requests 70, a destination address 90 having a specific value (e.g., 16' hFFFF which is a permissive destination address) causes the destination routing request 70 to be directed to the management port 26.

As illustrated in FIG. 10, a hit on the multicast forwarding table 214 causes the output of the multicast vector 218 that, together with the output ports 226 and 228, provides input to a MUX 230 that operates to select between these inputs. For the purposes of illustrating the present invention, assume that the MUX 230 selects the multicast vector 218 as an output.

The multicast vector 218 is shown to comprise a number of bit entries corresponding to the number of communications ports 24 of a data path 20. Within the multicast vector 218, set bits identify respective output communications ports 24 to which a packet associated with the multicast request 213 should be transferred from a relevant input communications port 24.

Returning to the flow chart illustrated in FIG. 9, at block 206, the request preprocessor 38 performs a count of valid bits within the multicast vector 218 to generate a bit count. At block 208, a total grant count 240 is set equal to the bit count.

At block 210, the request preprocessor 38, and specifically the multicast processor 122, operates to spawn multiple unicast packet transfer requests (e.g., packet transfer requests 130 illustrated in FIG. 7) as specified by set bits within the multicast vector 218. Further, each spawned unicast packet transfer request 130, as illustrated in FIG. 7, is shown to include the total grant count 136 as set at block 208. The multiple unicast packet transfer requests 130 are then communicated from the request preprocessor 38 to the resource allocator 40 for arbitration.

At block 212, the resource allocator 40, in an out-of-order (OOO) manner, issues transfer grants 180, for example such as the transfer grant 180 illustrated in FIG. 8, to be relevant input communications port 24 responsive to each of the unicast packet transfer requests 130 received at block 210. As illustrated in FIG. 8, each transfer grant 180 again includes the total grant count 136.

Figure 11:
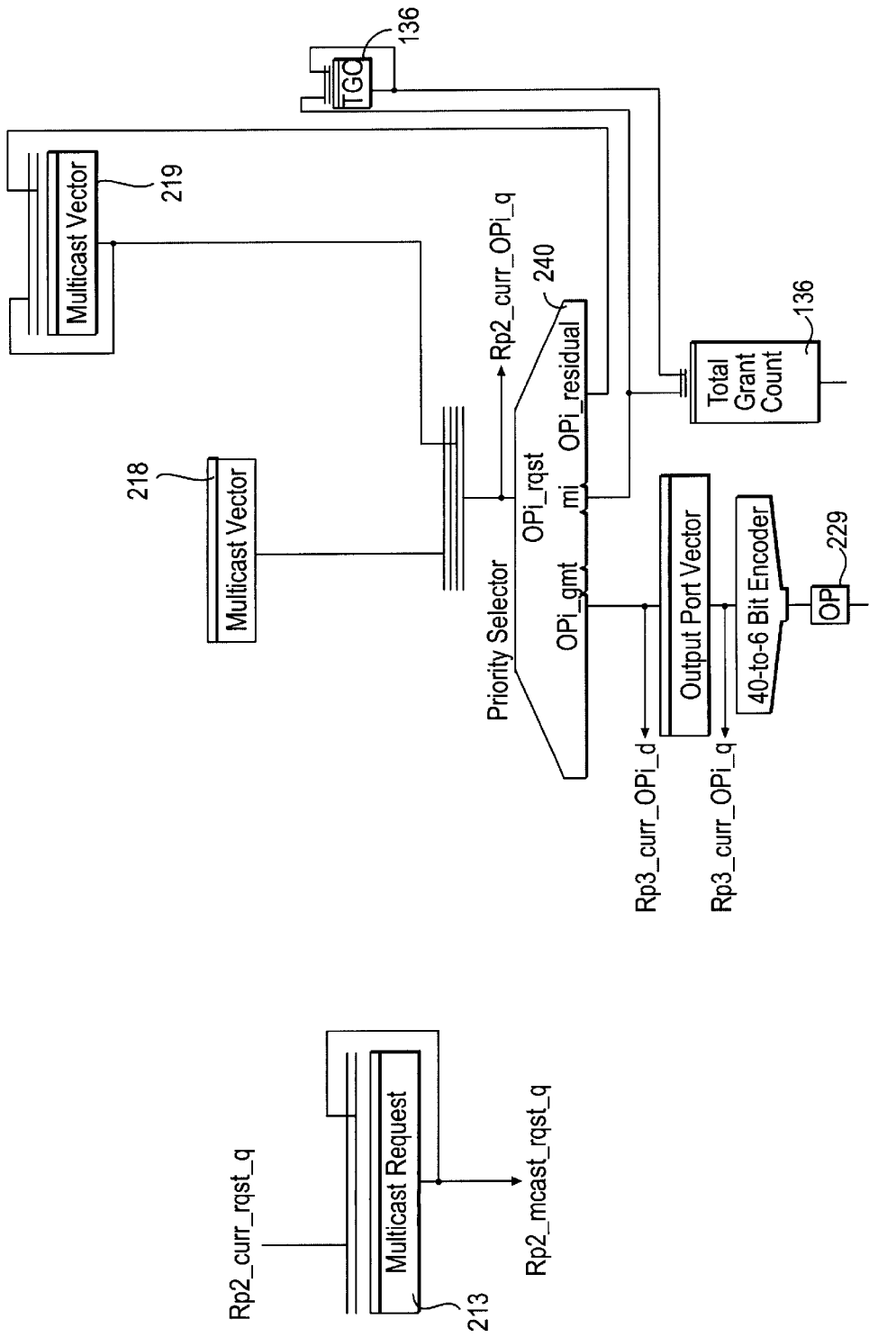
FIG. 11 is a pipestage diagram providing further details regarding operations performed to spawn multiple unicast packet transfer requests, according to an exemplary embodiment of the present invention.

FIG. 11 is a pipestagepipestage diagram providing further details regarding operations performed at block 206–210 of FIG. 9. Specifically, at the commencement of a further pipestage, the multicast vector 218 is latched for a number of clock cycles in order to generate the multiple unicast transfer requests 130. The number of cycles for which the multicast vector 218 is latched is dependent upon the number of set bits within the multicast vector 218 (i.e., the fanout of the multicast vector 218).

As stated above, a multicast request 213 spawns a number of unicast transfer requests 130, as specified by bits of the multicast vector 218, which includes one bit per output per port including the management port 26 and the functional BIST port 28.

During a first spawning cycle, the multicast processor 122 tallies the number of output communications ports 24 to which the packet associated with the multicast request 213 will be transferred, based on the number of set bits within the multicast vector 218. This tally comprises the total grant count 136, which is saved at a register, as indicated in FIG. 11, for the duration of the multicast spawning process. As noted above, the total grant count 136 is included within each transfer grant 180. This enables an input communications port 24 to determine when the last transfer grant 180 has issued, and the relevant packet can be discarded. Transfer grants 180 issued responsive to the spawned transfer requests 130 may not be issued in the order in which the spawned transfer requests 130 were generated, and the actual grant order is affected by, inter alia, output communications port 24 availability.

During each multicast spawning cycle, the multicast processor 122 generates one unicast transfer request 130 for the output communications port 24 corresponding to a set bit in the multicast vector 218. As set bits within the multicast vector 218 are used, they are stripped from the multicast vector 218 to produce a residual multicast vector 219, as shown in FIG. 11.

Figure 12:
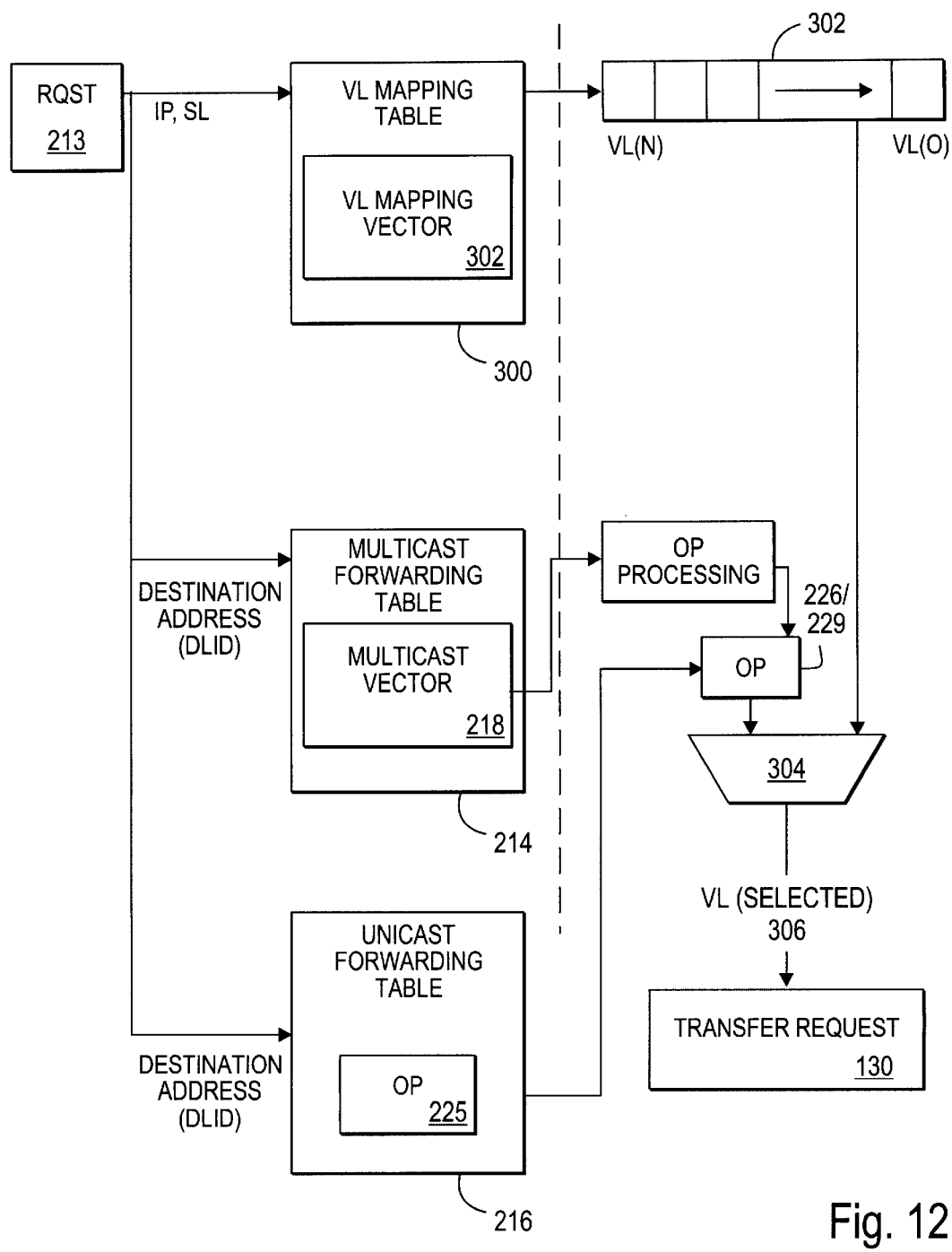
FIG. 12 is a block diagram illustrating parallel lookups on a second memory structure that stores a forwarding table (e.g., the unicast and/or multicast forwarding tables) and on a first memory structure that stores a virtual lane (VL) mapping table, according to an exemplary embodiment of the present invention.

As noted above with reference to FIG. 6, the request preprocessor 38 of the arbiter 36 includes both the forwarding table lookup stage 120 and the virtual lane mapper stage 124. The forwarding table lookup stage 120 is described in some detail above. A more detailed discussion regarding the virtual lane mapper stage 124 now follows. FIG. 12 is a block diagram illustrating a method and system, according to an exemplary embodiment of the present invention, of mapping a service level, associated with a packet, to a data stream in the exemplary form of a virtual lane, according to an exemplary embodiment of the present invention. Specifically, FIG. 12 illustrates parallel lookups on a second memory structure that stores a forwarding table (e.g., the unicast and/or multicast forwarding tables 214 or 216 discussed above) and on a first memory structure that stores a virtual lane (VL) mapping table 300. The first and second memory structures may each comprise any well-known memory structures (e.g., RAMs, registers, etc.).

Dealing briefly with the lookup on a forwarding table, an original transfer request 213, received at the request preprocessor 38 and generated responsive to receipt of an associated packet at an input communications port 24 of an interconnect device, includes a destination address 90 (or DLID) that is utilized to perform a lookup on the forwarding table. In the case where the original transfer request 213 is a multicast transfer request, a hit on the multicast forwarding table 214 causes the output of a multicast vector 218 that is processed to identify a number of output ports 229 for inclusion within a number of spawned, unicast transfer requests 130. This process is described above with reference to FIG. 11.

When a hit occurs on a unicast forwarding table 216, the relevant output port 226 is outputted directly without any output port processing, as illustrated in FIGS. 10 and 12.

FIG. 12 illustrates that the selection of an output port 229 or 226 is performed in parallel with a lookup on the virtual lane mapping table 300. In one embodiment, the lookup on the virtual lane mapping table 300 is performed to select a number of data streams, in the exemplary form of virtual lanes, based on an input port (IP) of a data path 20 on which a packet, associated with the original request 213, was received and also based on a service level associated with the respective packet and as indicated within the original request 213. Specifically, as indicated in FIG. 12, the input port identifier 82 and the service level identifier 94 of a destination routing request 70 (illustrated in FIG. 5), may be utilized to perform a lookup on the virtual lane mapping table 300 to identify a virtual lane mapping vector 302, stored within an entry of the virtual lane mapping table 300. Table 3, below, provides a description of an exemplary entry within the virtual lane mapping table 300:

TABLE 3

VL Mapping Vector

| Bit Range | Size (bits) | Field Name/Description |
| --- | --- | --- |
| 71:68 | 4 | Virtual Lane for Output Port 17 (Test Unit) |
| 67:64 | 4 | Virtual Lane for Output Port 16 |
| 63:60 | 4 | Virtual Lane for Output Port 15 |
| 59:56 | 4 | Virtual Lane for Output Port 14 |
| 55:52 | 4 | Virtual Lane for Output Port 13 |
| 51:48 | 4 | Virtual Lane for Output Port 12 |
| 47:44 | 4 | Virtual Lane for Output Port 11 |
| 43:40 | 4 | Virtual Lane for Output Port 10 |
| 39:36 | 4 | Virtual Lane for Output Port 9 |
| 35:32 | 4 | Virtual Lane for Output Port 8 |
| 31:28 | 4 | Virtual Lane for Output Port 7 |
| 27:24 | 4 | Virtual Lane for Output Port 6 |
| 23:20 | 4 | Virtual Lane for Output Port 5 |
| 19:16 | 4 | Virtual Lane for Output Port 4 |
| 15:12 | 4 | Virtual Lane for Output Port 3 |
| 11:08 | 4 | Virtual Lane for Output Port 2 |
| 07:04 | 4 | Virtual Lane for Output Port 1 |
| 03:00 | 4 | Virtual Lane for Output Port 0 (Mgmt. Unit) |

As will be noted from the above Table 3, a virtual lane mapping vector 302, as stored within an entry of the virtual lane mapping table 300, contains one 4-bit value identifying an output virtual lane for each of the communications ports 24 associated with a data path 20. In other words, a virtual lane mapping vector 302 identifies a number of virtual lanes, each of these virtual lanes being associated with one or multiple output communications ports 24 of an interconnect device.

Figure 13:
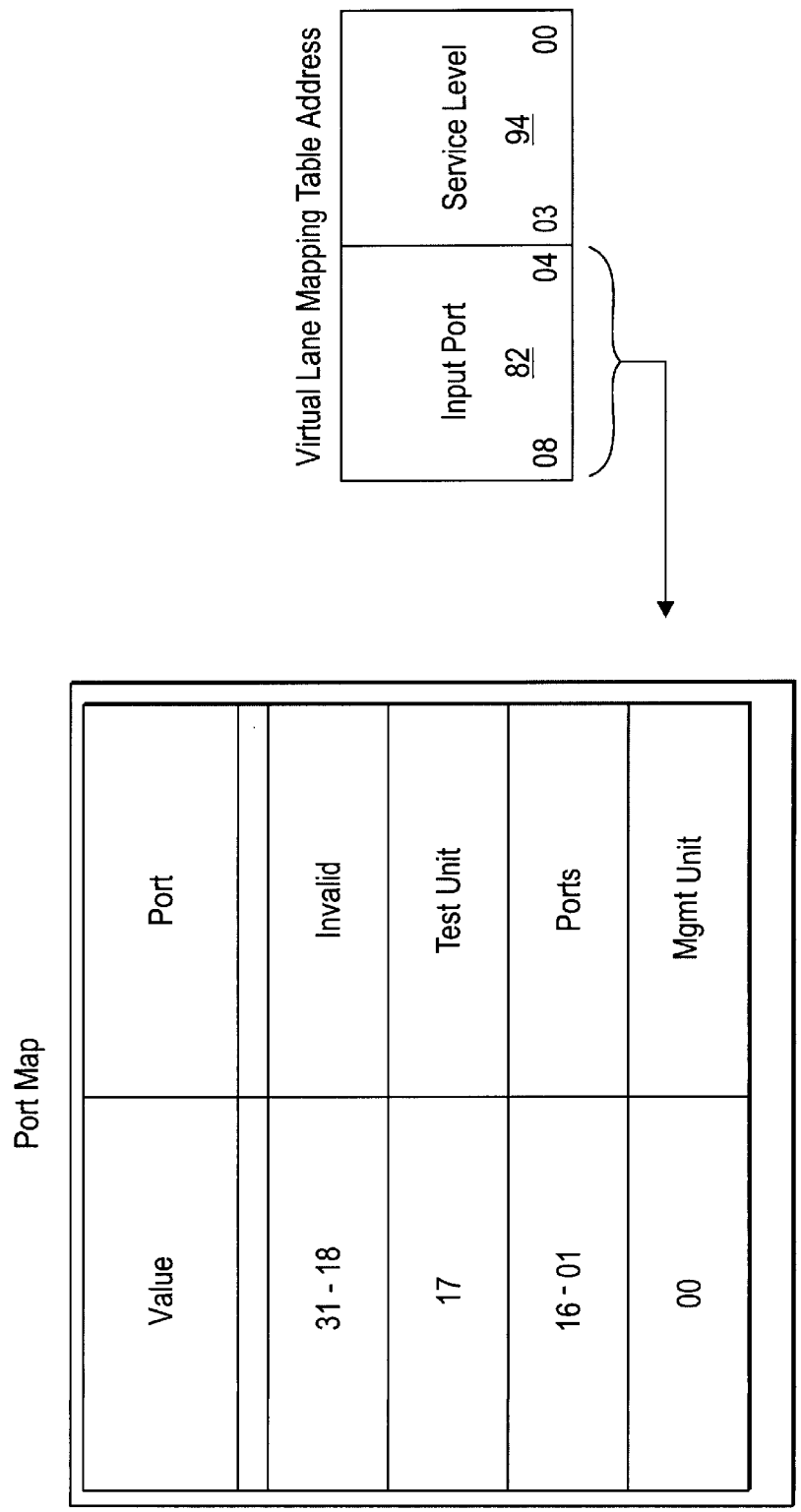
FIG. 13 illustrates that, in one exemplary embodiment, a virtual lane mapping table is indexed utilizing the input port identifier and the service level identifier, as extracted from an original request.

FIG. 13 illustrates that, in one exemplary embodiment, the virtual lane mapping table 300 is indexed utilizing the input port identifier 82 and the service level identifier 94, as extracted from an original request 213.

FIG. 12 illustrates that the virtual lane mapping vector 302, outputted from the virtual lane mapping table 300, provides input to a selector an exemplary form of a MUX 304, for which the output port 229 or 226, determined at the forwarding table lookup stage 120, operates as a selector. Specifically, as noted above, each 4-bit value within the virtual lane mapping vector 302 is associated with a specific output port, and identifies a virtual lane associated with that output port. The output port inputted to the MUX 304 is utilized to select a 4-bit value within the vector 302 that corresponds to the relevant output port, the selected 4-bit value identifying a virtual lane to be selected, and to be outputted from the MUX 304 as the selected virtual lane 306. The selected virtual lane 306 is then included within a packet transfer request 130 as a virtual lane identifier 134, as illustrated in FIG. 7.

As will be appreciated from the above, in order properly to select the selected virtual lane 306, the input port, service level and output port for a particular packet are required. The system and method described above with reference to FIG. 12 is advantageous in that time-consuming lookup operations on the virtual lane mapping table 300 and a forwarding table are performed in parallel and, at least to a certain degree, concurrently. The respective outputs of these lookup operations are then fed to the MUX 304, which is able to perform a selection operation. The selection operation performed by the MUX 304, it will be appreciated, is a less time consuming operation than the lookup operations performed on the tables. By performing the time-consuming lookup operations in parallel, the overall operation of selecting the selected virtual lane 306 may performed in a reduced time. For example, the lookup operations may be performed during the first portion of a clock cycle, with the selection operation by the MUX 304 being performed toward the end of the same clock cycle.

The advantage of the present invention becomes particularly apparent when one considers what is required to perform a lookup on a SL-to-VL Mapping Table, described above in Table 1. Specifically, each entry within this table is indexed by an input port, output port combination. In order to perform a lookup on this table, the appropriate output port must be known. This requires that the appropriate output port be identified by performing a lookup on a forwarding table prior to commencing the lookup on the SL-to-VL Mapping Table. This in turn requires that a lookup on a forwarding table, and a lookup on the SL-to-VL Mapping Table be performed serially. Accordingly, utilizing the SL-to-VL Mapping Table as described to perform the selection of a selected virtual lane 306 would require sufficient time to perform two serial lookup operations, namely a first lookup operation on a forwarding table and a second lookup operation on the SL-to-VL Mapping Table. In one embodiment, by performing the lookup on the virtual lane mapping table 300 and a forwarding table in parallel, the present invention enables the selection of the selected virtual lane 306 in an operation that requires approximately the time to perform only the longer of a lookup operation on the virtual lane mapping table 300 or a forwarding table. As noted above with reference to FIG. 12, the parallel lookup on the virtual lane mapping table and the forwarding table is enabled by having the virtual lane mapping table 300 indexed utilizing an input port, service level combination, as opposed to an output port in combination with an input port and/or a service level as is required to perform a lookup on an SL-to-VL Mapping Table.

Figure 14:
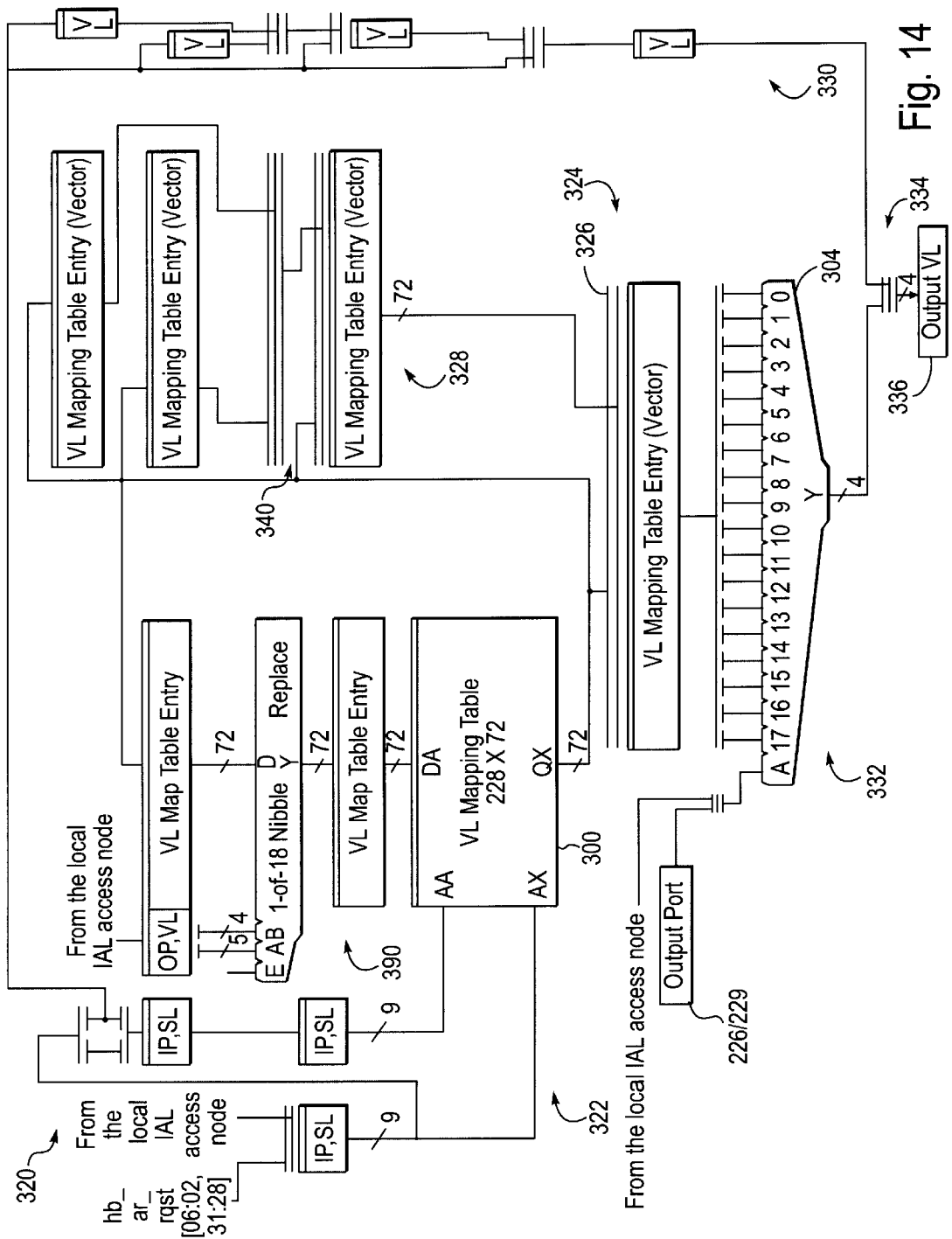
FIG. 14 is a pipestage diagram, according to an exemplary embodiment of the present invention, illustrating further details regarding a method and system to map service level to a data stream, (e.g., a virtual lane) within an interconnect device.

FIG. 14 is a pipestage diagram, according to an exemplary embodiment of the present invention, illustrating further details regarding a method and system to map service level to a data stream, (e.g., a virtual lane) within an interconnect device. As noted above, virtual lane mapping translates the input port, output port and service level associated with a packet received at an interconnect device into an output data stream, in the form of a virtual lane. In one embodiment of the present invention, virtual lane mapping is applied to all non-VL 15 packet transfer requests 128 and 130, as illustrated in FIG. 7. FIG. 14 illustrates that, as is described above, during the virtual lane mapper stage 124, an input port identifier 82 and a service level identifier 94 are used to index the virtual lane mapping table 300. The access to the virtual lane mapping table 300 is done in parallel with a destination address (or DLID)-to-output port translation. The selected entry of the virtual lane mapping table 300 stores a virtual lane mapping vector 302 that identifies an output virtual lane for each of the output communications ports 24 of a data path 20. Utilizing a selected output port 229/226, the selected virtual lane 306 is selected.

Referring now more specifically to FIG. 14, as indicated at 320, for an incoming, original request 213, the input port (IP) and service level (SL) are latched at a first pipestage stage. As indicated at 322, the latched input port (IP) and service level (SL) values are used to index into the virtual lane mapping table 300. At 324, a MUX 326 selects between a virtual lane mapping vector 302, as indexed within the virtual lane mapping table 300, and a further virtual lane mapping vector 302, indicated at 328, that has been registered for multicast request processing. The selected vector 302 is then latched.

As indicated at 330, where the original request 213 is a credit update request 74, the virtual lane identifier 102 of the credit update request 74 is simply passed through. A multiplexer operates to select between a direct flow-through path, and a queued request path. Specifically, an incoming credit update request 74 will be queued when it is followed by a multicast request by one or two clock cycles.

As indicated at 332, using the selected output port 229/226 generated by the forwarding table lookup stage 120, the a MUX 304 selects a selected virtual lane 336 from the virtual lane mapping vector 302 latched at 324 during a preceding pipestage.

As indicated at 334, depending on the type of the original request 213 (e.g., a routing request 70 or 72, or a credit update request 74), either the selected (or mapped) virtual lane 306 or a pass-through virtual lane latched at 330, is outputted as an output virtual lane 336.

Dealing specifically with the situation where the original request 213 is a multicast transfer request, as indicated at 340, the relevant virtual lane mapping vector 302 is held for the purposes of spawning multiple unicast packet transfer requests 130. Each spawned request 130 may map to a different output virtual lane, depending on the virtual lane mapping vector 302.

Subsequent requests that are queued during multicast processing pass through the same registers, and for this reason FIG. 14 illustrates a two-entry queue that is maintained for requests immediately following a multicast request.

Generation of the Virtual Lane Mapping Table (300)

As described above, in one embodiment of the present invention, the parallel lookup on the virtual lane mapping table 300 and a forwarding table is facilitated by having the virtual lane mapping table 300 indexed by an input port, service level combination. However, a subnet manager conforming to, for example, the IBA specification may seek to construct a SL-to-VL Mapping Table, as described in the Background section of the present specification, within an interconnect device for the purposes of performing service level-to-virtual lane mapping. Accordingly, the present invention, in one embodiment, deploys a translator 386 to receive logical elements from a subnet manager 382 intended for the construction of a SL-to-VL Mapping Table, and to perform translations of the organization of such logical elements to generate physical elements that may be utilized to construct the virtual lane mapping table 300, which is indexed by an input port, service level combination as opposed to an input port, output port combination. Similarly, the translator 386 operates to receive physical elements from the virtual lane mapping table 300, and to perform translations of the organization of such physical elements to generate logical elements that are meaningful to a subnet manager 382. It should be noted that the translations performed by the translator 386 are for the purposes of translating the organization of elements (i.e., translating a physical organization to a logical organization, or vice versa). The translations are not performed to modify values embodied in the elements.

Figure 15:
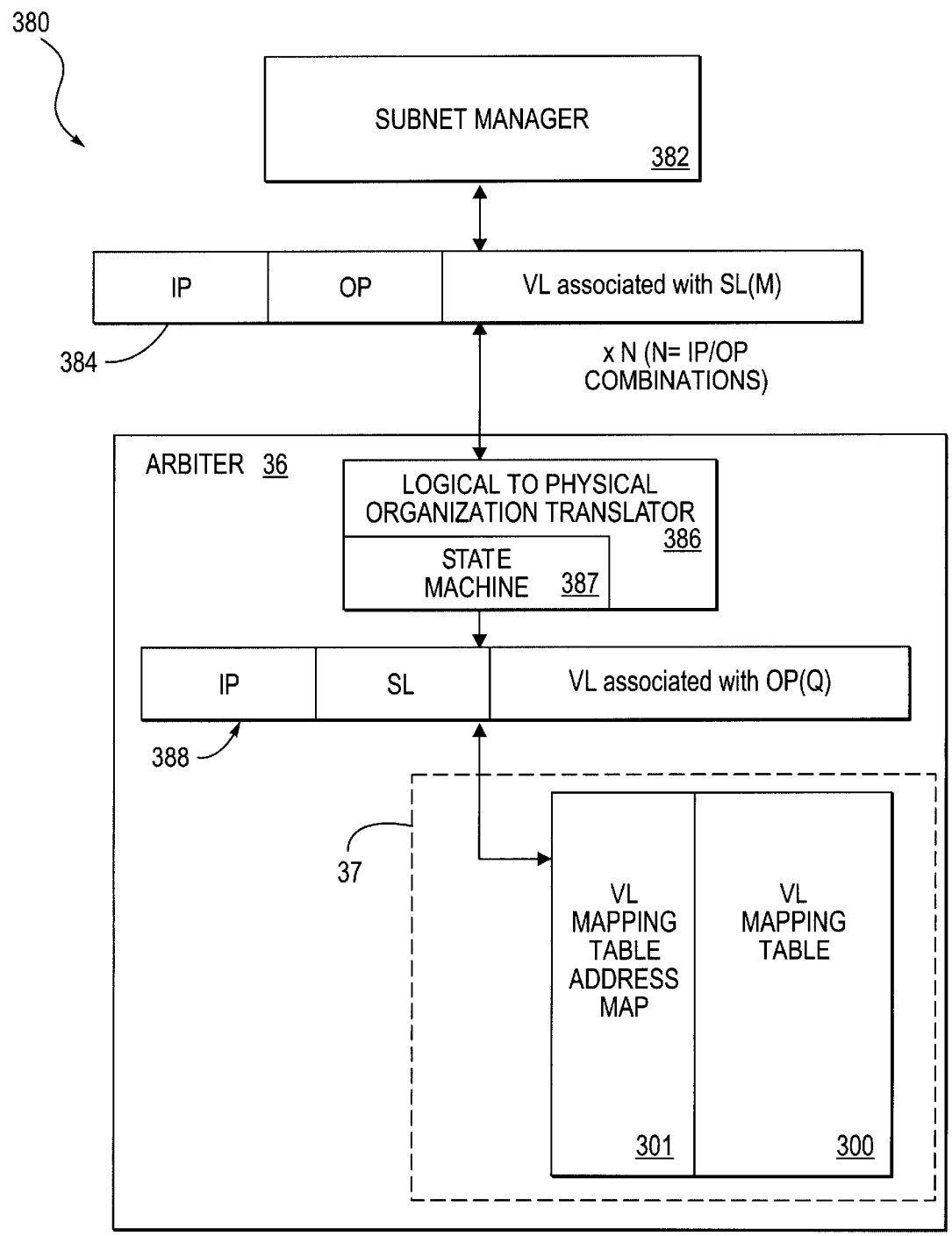
FIG. 15 is a block diagram illustrating a method and system, according to an exemplary embodiment of the present invention, of accessing a virtual lane mapping table.

FIG. 15 also shows the translator 386 as incorporating a state machine 387 that, in one embodiment of the present invention, facilitates a walk through the virtual lane table 300 for the purposes of facilitating accesses to the table 300. FIG. 15 is a block diagram illustrating a method and system 380, according to an exemplary embodiment of the present invention, of accessing the virtual lane mapping table 300. Writing to the virtual lane mapping table 300 is performed so that the physical organization of the virtual lane mapping table 300 facilitates the parallel access to the virtual lane mapping table 300 and a forwarding table, as discussed above. Specifically, according to the present invention, the virtual lane mapping table 300 is constructed so as to be indexed by an input port, service level combination.

Nonetheless, it will be appreciated that a subnet manager 382, such as that shown in FIG. 15, operating according to the IBA specification must be afforded both read and write access to the virtual lane mapping table 300. The subnet manager 382, if conforming to the IBA specification, expects to be performing a read and write accesses to a SL-to-VL Mapping Table having a logical organization as discussed in the background section of the present specification. Accordingly, the subnet manager 382 is shown to transmit and receive first logical format elements 384, in the form of 16-element vectors of the virtual lanes associated with 16 service levels (0–15) as specified by the IBA specification, for the purposes of reading from and writing to the virtual lane mapping table 300. For the purposes of describing translation operations that are performed by the translator 386, FIG. 15 illustrates the transmission of a single element 384 between the subnet manager 382 and the translator 386, and a single element 388 between the translator and a virtual lane mapping table 300. Nonetheless, it will be appreciated that any of these communications with the translator 386 may be performed utilizing 16-element vectors, as described in the IBA specification.

The present invention, it will be recalled, proposes to substitute the SL-to-VL Mapping Table specified by the IBA specification with the virtual lane mapping table 300 to facilitate the parallel accesses. As illustrated, each first logical format element 384 is indexed by an input port, output port combination, and indicates a virtual lane associated with a each of M service levels.

Figure 16:
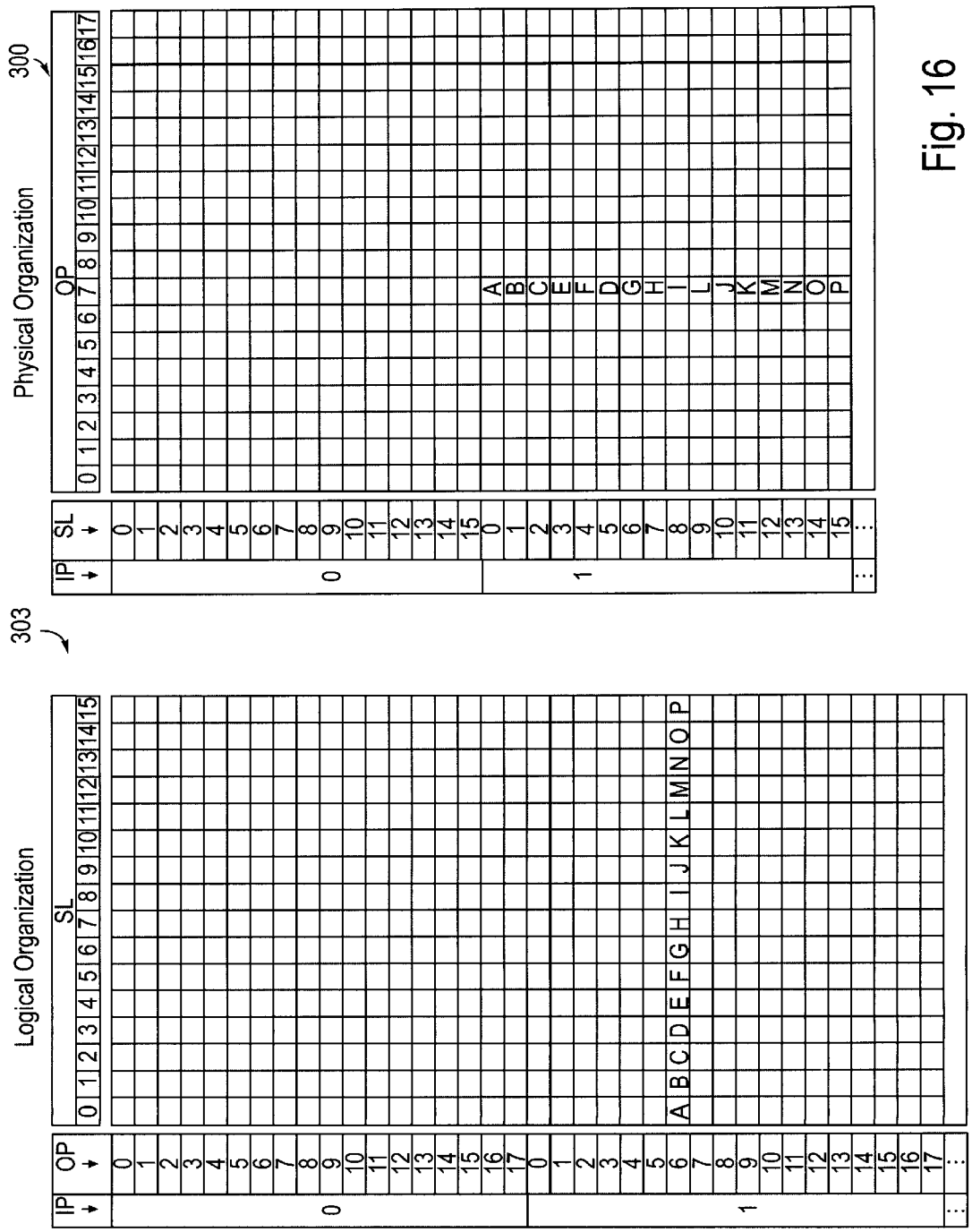
FIG. 16 is a diagram illustration how the physical organization of a virtual lane mapping table, according to the present invention, differs from the logical organization of a SL-to-VL Mapping Table.

The arbiter 36 is shown to include a logical-to-physical organization translator 386 (e.g., implemented in combinational logic) that operates to convert a first logical format element 384, as specified by the capital IBA specification, into a second physical format element 388 for the virtual lane mapping table 300, and vice versa. As illustrated, the second physical format element 388 is indexed by an input port, service level combination, and identifies a virtual lane associated with a particular output port Q of the output communications ports 24 associated with a data path 20. When performing write operations to the virtual lane mapping table 300, second physical format elements 388 are generated from corresponding first logical format elements 384 by the translator 386, and are utilized to construct a virtual lane mapping vector 302 within an entry of the virtual lane mapping table 300. It will be appreciated that each element 388 only populates one 4-bit range within an appropriate vector for a particular input port, service level combination associated with the output port Q. Accordingly, to complete construction of a vector 302, a second physical format element 388 must be generated for each output communications port 24 of the interconnect device. Similarly, when performing read operations from the virtual lane mapping table 300, second physical format entries 388 are read from the virtual lane mapping table 300, and are translated into corresponding first logical format elements 384 by the translator 386, and then communicated back to the subnet manager 382. A more detailed discussion regarding the differences between the logical organization of a SL-to-VL Mapping Table 303, as defined by the IBA specification, and the logical organization of a virtual lane mapping table 300, according to the present invention, will now be provided. According to one aspect of the present invention, and as illustrated in FIG. 16, the physical organization of a virtual lane mapping table 300 differs from the logical organization of a SL-to-VL Mapping Table 303 set down in the IBA specification for a subnet manager 382. Nonetheless, a subnet manager 382 must be afforded read and write access to the virtual lane mapping table 300. Specifically, in the logical organization of the SL-to-VL Mapping Table 303, there is one SL-to-VL Mapping Table entry for each IP-OP combination. Each entry within the table 303 is a vector of virtual lanes with one element per service level. In the physical organization of the virtual lane mapping table 300, there is one entry for each IP-SL combination. Each entry within the table 300 is a vector of virtual lanes with one element per OP.

As stated above, a subnet manager 382, conforming to the IBA specification, will attempt to perform read and write accesses based on the logical organization of the table 303. An access reads or writes one logical entry. However, the elements in a logical entry are spread across 16 physical entries. In FIG. 16, the elements for input port 1, output port 6 and service levels 0, 1, 2, . . . 15 are labeled A, B, C, . . . P, respectively.

Consider a read operation performed by the subnet manager 382, where the read operation is based on the assumption of a logical organization of the table 303. According to the present invention, a state machine 387 walks through the 16 physical table entries for input port 1 and service levels 0–15 and extracts the element for output port 6 in each entry of the virtual lane mapping table 300, having the physical organization illustrated in FIG. 16, to construct a logical table entry conforming to the logical organization of the SL-to-VL Mapping Table 303.

Consider a write operation performed by the subnet manager 382 to an assumed entry within a logical SL-to-VL Mapping Table 303 (which in the present invention has been substituted by a virtual lane mapping table 300). A state machine 387, according to the present invention, walks through the 16 physical table entries of the virtual lane mapping table 300 for input port 1 and service levels 0–15, doing a read-modify-write on each of those physical table entries. The physical table entry modification, in one embodiment, is the replacement of the element for output port 6 with the corresponding value in the logical table entry, while retaining the existing values of the other elements in the physical table entry.

Figure 17:
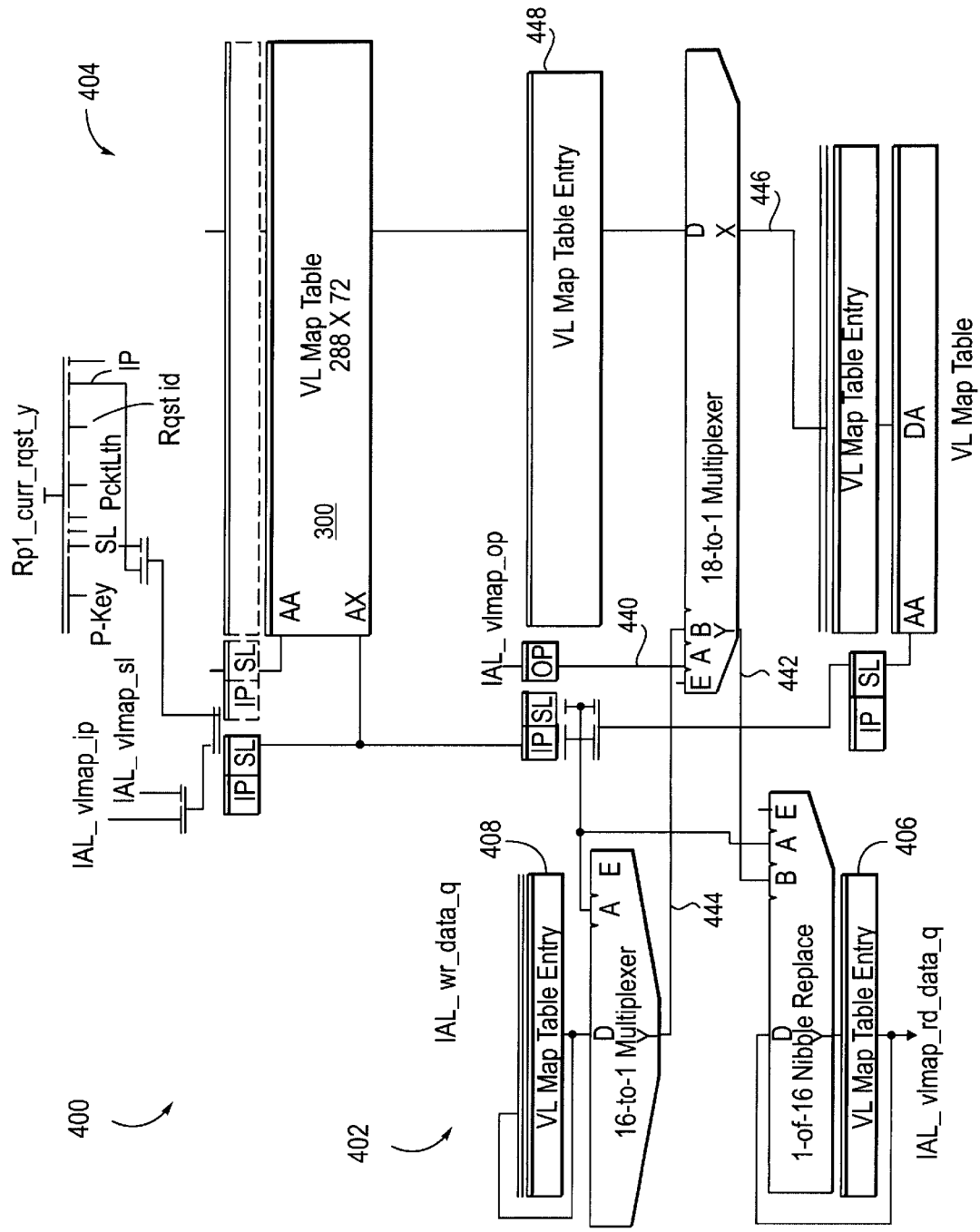
FIG. 17 is a pipestage diagram illustrating a system (or apparatus) for facilitating access (read and or write access) to a virtual lane mapping table, according to an exemplary embodiment of the present invention.

FIG. 17 is a pipestage diagram illustrating a system (or apparatus) 400 for facilitating access (read and or write access) to a virtual lane mapping table 300, according to an exemplary embodiment of the present invention. Logical table entry registers to latch logical format elements 384 are indicated at 402. Physical table (or virtual lane mapping table 300) registers and the virtual lane mapping table 300 are indicated at 404. While walking through a presumed logical SL-to-VL mapping table 303, the service level (i.e., low-order 4 bits of the table index) is initially set to 0 and then incremented for each successive access until it reaches 15.

During a read operation on the virtual lane mapping table 300, a logical entry, for communication to the subnet manager 382, is accumulated one element at a time in a register 406. The virtual lane mapping table 300, as described above, is read using the input port and service level as the index 437. The output port 440 is used to select the proper element from the physical table entry 448 of the virtual lane mapping table 300.

During a write operation to the virtual lane mapping table 300, the logical (SL-to-VL Mapping) table entry, as received from the subnet manager 382, is held in a register 408. A physical entry is then read from the virtual lane mapping table 300. Using the current service level, an element 444 is extracted from the logical table entry held in the register 408. This extracted element is used to the replace the element in the physical table entry 448 of the virtual lane mapping table 300 for the specified output port. None of the other physical table entry elements within the virtual lane mapping table 300 are changed. The modified physical table entry 446 is written back into the virtual lane mapping table 300 at the same index from which it was read.

Note also that embodiments of the present description may be implemented not only within a physical circuit (e.g., on semiconductor chip) but also within machine-readable media. For example, the circuits and designs discussed above may be stored upon and/or embedded within machine-readable media associated with a design tool used for designing semiconductor devices. Examples include a netlist formatted in the VHSIC Hardware Description Language (VHDL) language, the Verilog language or the SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Thus, it is also to be understood that embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Thus, method and system to map a service level, associated with a packet received an interconnect device, to an output data stream supported by the interconnect device have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method automatically to map a service level to a data stream within an interconnect device, the method including:

selecting a plurality of data streams, each of the plurality of data streams being associated with a respective output port of the interconnect device, the plurality of data streams being selected based on (1) an input port of the interconnect device on which a packet is received and (2) a service level associated with the packet;

in parallel with the selecting of the plurality of data streams, selecting an output port of the interconnect device to which to transfer the packet from the input port of the interconnect device on which the packet is received; and selecting a data stream, from among the selected plurality of data streams, utilizing the selected output port, the selected data stream being selected as a data stream into which the packet is included for transmission from the selected output port of the interconnect device.

2. The method of claim 1 wherein the selecting of the selected plurality of data streams and the selecting of the selected output port are performed responsive to receipt of a request, associated with the packet, at an arbiter of the interconnect device.

3. The method of claim 1 wherein the selecting of the selected plurality of data streams and the selecting of the selected output port are performed concurrently during a common clock cycle.

4. The method of claim 1 wherein the selecting of the selected plurality of data streams includes selecting a first entry within a mapping table, the first entry identifying the plurality of data streams and the association between each of the plurality of data streams and a respective output port.

5. The method of claim 4 wherein the input port and the service level associated with the packet are utilized to perform a lookup on the mapping table.

6. The method of claim 1 wherein each of the plurality of data streams comprises a virtual lane.

7. The method of claim 1 wherein the selecting of the selected output port includes selecting a first entry within a forwarding table.

8. The method of claim 7 wherein a destination address associated with the packet is utilized to perform a lookup in the forwarding table.

9. The method of claim 7 wherein the forwarding table comprises a multicast forwarding table, the first entry identifies a plurality of output ports, and the selecting of the selected output port includes selecting the selected output port from among the plurality of output ports identified by the first entry.

10. The method of claim 4 including constructing the mapping table utilizing a plurality of service level-to-virtual lane mapping records received at the interconnect device from a subnet manager, wherein each of the plurality of service level-to-virtual lane mapping records is indexed by an input port-output port combination.

11. The method of claim 10 wherein the construction of the mapping table includes performing an index conversion on each of the plurality of service level-to-virtual lane mapping records to create a plurality of output port-to-virtual lane mapping records indexed by an input port-service level combination.

12. The method of claim 11 wherein the construction of the mapping table includes writing each of the plurality of output port-to-virtual lane mapping records into the mapping table.

13. A system automatically to map a service level to a data stream within an interconnect device, the system including:

a first memory structure from which to select a plurality of data streams, each of the plurality of data streams being associated with a respective output port of the interconnect device, the plurality of data streams being selected based on (1) an input port of the interconnect device on which a packet is received and (2) a service level associated with the packet;

a second memory structure from which, in parallel with the selecting of the plurality of data streams from the first memory structure, to select an output port of the interconnect device to which to transfer the packet from the input port of the interconnect device on which the packet is received; and a selector to select a data stream, from among the selected plurality of data streams, utilizing the selected output port, the selected data stream being selected as a data stream into which the packet is included for transmission from the selected output port of the interconnect device.

14. The system of claim 13 wherein the first memory structure from which to select the selected plurality of data streams and the second memory structure from which to select the selected output port are associated with arbiter of the interconnect device, and the selection of the plurality of data streams and the selection of the selected output port of performed responsive to receipt of the arbiter of a request for resources, the request being associated with a packet received at the interconnect device.

15. The system of claim 13 wherein the selecting of the selected plurality of data streams and the selecting of the selected output port are performed concurrently during a common clock cycle.

16. The system of claim 13 wherein the selecting of the selected plurality of data streams includes selecting a first entry within a mapping table, the first entry identifying the plurality of data streams and the association between each of the plurality of data streams and a respective output port.

17. The system of claim 16 wherein the input port and the service level associated with the packet are utilized to perform a lookup on the mapping table.

18. The system of claim 13 wherein each of the plurality of data streams comprises a virtual lane.

19. The system of claim 13 wherein the selecting of the selected output port includes selecting a first entry within a forwarding table stored within the second memory structure.

20. The system of claim 19 wherein a destination address associated with the packet is utilized to perform a lookup in the forwarding table stored within the second memory structure.

21. The system of claim 20 wherein the forwarding table comprises a multicast forwarding table, the first entry identifies a plurality of output ports, and the selecting of the selected output port includes selecting the selected output port from among the plurality of output ports identified by the first entry.

22. The system of claim 16 including a translator to construct the mapping table utilizing a plurality of service level-to-virtual lane mapping records received at the interconnect device from a subnet manager, wherein each of the plurality of service level-to-virtual lane mapping records is indexed by an input port-output port combination.

23. The system of claim 10 wherein the translator is to perform an index conversion on each of the plurality of service level-to-virtual lane mapping records to create a plurality of output port-to-virtual lane mapping records indexed by an input port-service level combination.

24. The system of claim 11 wherein the translator is to write each of the plurality of output port-to-virtual lane mapping records into the mapping table.

25. A system automatically to map a service level to a data stream within an interconnect device, the system including:

a first means from which to select a plurality of data streams, each of the plurality of data streams being associated with a respective output port of the interconnect device, the plurality of data streams being selected based on (1) an input port of the interconnect device on which a packet is received and (2) a service level associated with the packet;

a second means from which, in parallel with the selecting of the plurality of data streams from the first memory structure, to select an output port of the interconnect device to which to transfer the packet from the input port of the interconnect device on which the packet is received; and third means for selecting a data stream, from among the selected plurality of data streams, utilizing the selected output port, the selected data stream being selected as a data stream into which the packet is included for transmission from the selected output port of the interconnect device.

26. A machine-readable medium storing a description of a circuit arrangement, said circuit arrangement including:

a first memory structure from which to select a plurality of data streams, each of the plurality of data streams being associated with a respective output port of an interconnect device the plurality of data streams being selected based on (1) an input port of the interconnect device on which a packet is received and (2) a service level associated with the packet;

a second memory structure from which, in parallel with the selecting of the plurality of data streams from the first memory structure, to select an output port of the interconnect device to which to transfer the packet from the input port of the interconnect device on which the packet is received; and a selector to select a data stream, from among the selected plurality of data streams, utilizing the selected output port, the selected data stream being selected as a data stream into which the packet is included for transmission from the selected output port of the interconnect device.

27. The machine-readable medium of claim 26 wherein the description comprises a behavioral level description of the circuit.

28. The machine-readable medium of claim 27 wherein the behavioral level description is compatible with a VHDL format.

29. The machine-readable medium of claim 27 wherein the behavioral level description is compatible with a Verilog format.

30. The machine-readable medium of claim 26 wherein the description comprises a register transfer level netlist.

31. The machine-readable medium of claim 26 wherein the description comprises a transistor level netlist.

* * * * *